(12) United States Patent
Imai et al.

(10) Patent No.: US 9,958,655 B2
(45) Date of Patent: May 1, 2018

(54) PROJECTION LENS SYSTEM WITH MAGNIFICATION-VARYING CAPABILITY AND PROJECTOR

(71) Applicant: Konica Minolta, Inc., Tokyo (JP)

(72) Inventors: Yusuke Imai, Osaka (JP); Kazuhiko Inoue, Osaka (JP)

(73) Assignee: Konica Minolta, Inc., Tokyo (JP)

( * ) Notice: Subject to any disclaimer, the term of this patent is extended or adjusted under 35 U.S.C. 154(b) by 0 days. days.

(21) Appl. No.: 15/265,468

(22) Filed: Sep. 14, 2016

(65) Prior Publication Data

US 2017/0075094 A1 Mar. 16, 2017

(30) Foreign Application Priority Data

Sep. 16, 2015 (JP) ................................. 2015-183032

(51) Int. Cl.
| | |
|---|---|
| *G02B 27/18* | (2006.01) |
| *G02B 15/177* | (2006.01) |
| *G02B 15/20* | (2006.01) |
| *G02B 27/00* | (2006.01) |
| *G02B 5/00* | (2006.01) |
| *G02B 13/16* | (2006.01) |

(52) U.S. Cl.
CPC ........... *G02B 15/177* (2013.01); *G02B 5/005* (2013.01); *G02B 13/16* (2013.01); *G02B 15/20* (2013.01); *G02B 27/0025* (2013.01)

(58) Field of Classification Search
CPC ....... G02B 13/16; G02B 13/009; G02B 15/16
USPC .................................................. 359/649–651
See application file for complete search history.

(56) References Cited

U.S. PATENT DOCUMENTS

| | | |
|---|---|---|
| 2015/0346464 A1 | 12/2015 | Imai et al. |
| 2016/0139382 A1* | 5/2016 | Ichimura .............. G02B 15/177 359/680 |

FOREIGN PATENT DOCUMENTS

| | | |
|---|---|---|
| JP | H08-5921 A | 1/1996 |
| WO | 2014/104083 A1 | 7/2014 |

* cited by examiner

*Primary Examiner* — William Choi
(74) *Attorney, Agent, or Firm* — Osha Liang LLP

(57) ABSTRACT

A projection lens system includes a first lens group including a 1a-th lens group having a negative refractive power, a 1b-th lens group having a positive or negative refractive power, and a 1c-th lens group having a positive or negative refractive power. During a zoom, the first lens group remains stationary on an optical axis. During a focus from a remote distance side to a close distance side, the 1a-th lens group remains stationary on the optical axis while the 1b-th and 1c-th lens groups move toward the enlargement conjugate side along different loci respectively. Conditional formula $-4.7 < fl/fw < -2.5$ is fulfilled at both the remote and close distance sides, where fl represents a focal length of the first lens group, and fw represents a focal length of the entire system at a wide-angle end.

20 Claims, 29 Drawing Sheets

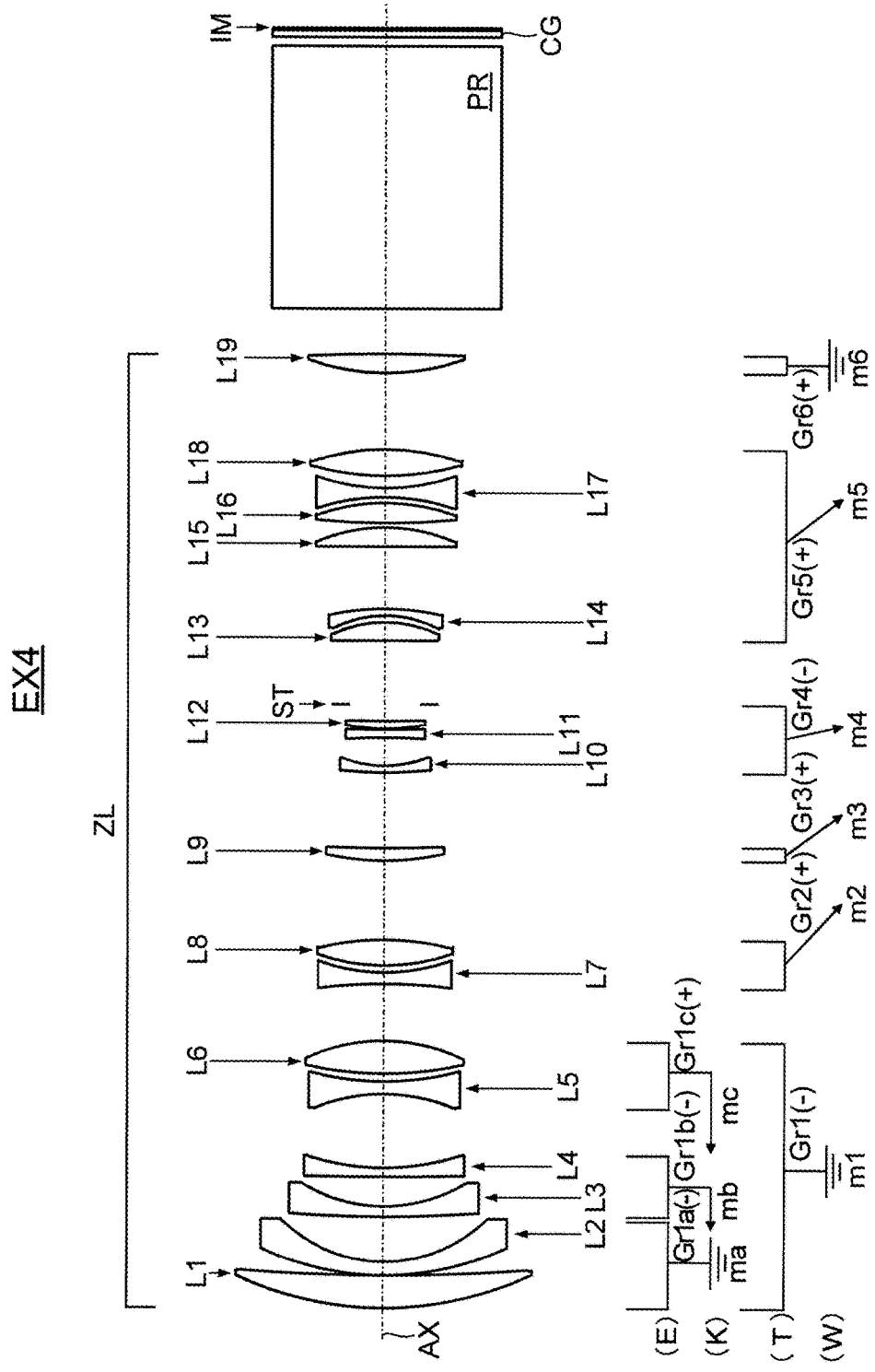

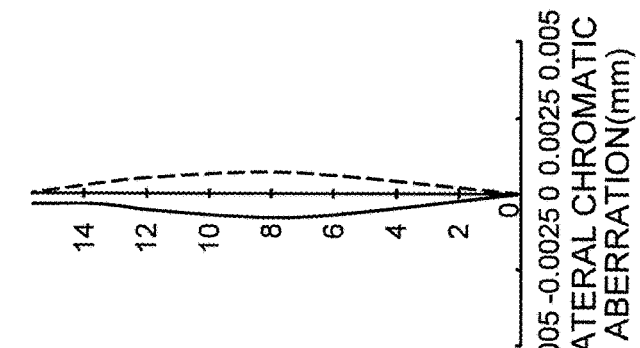
FIG.5A EX1-T-K
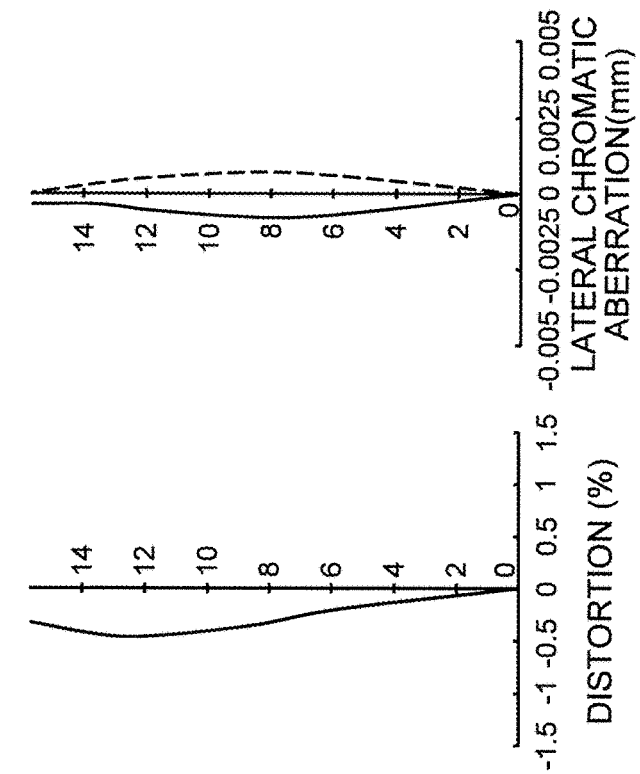
FIG.5B EX1-T-K
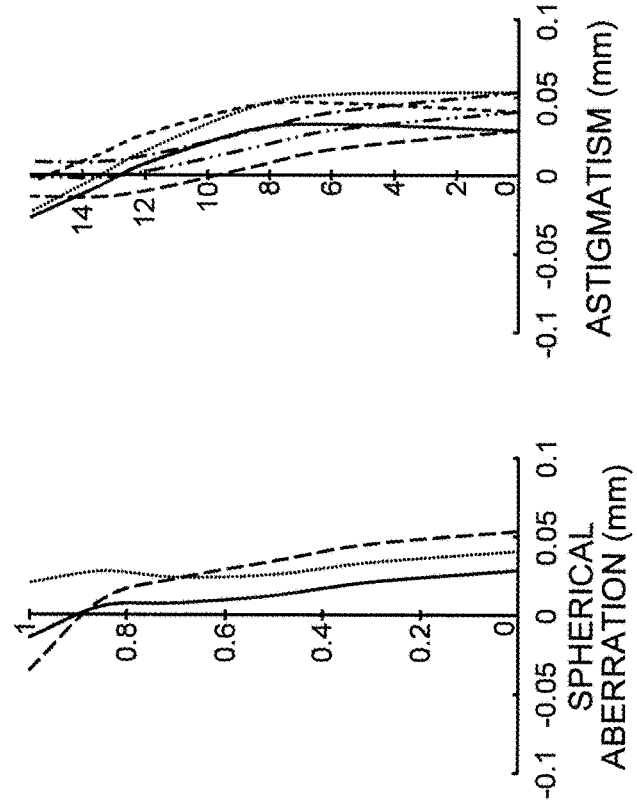
FIG.5C EX1-T-K
FIG.5D EX1-T-K

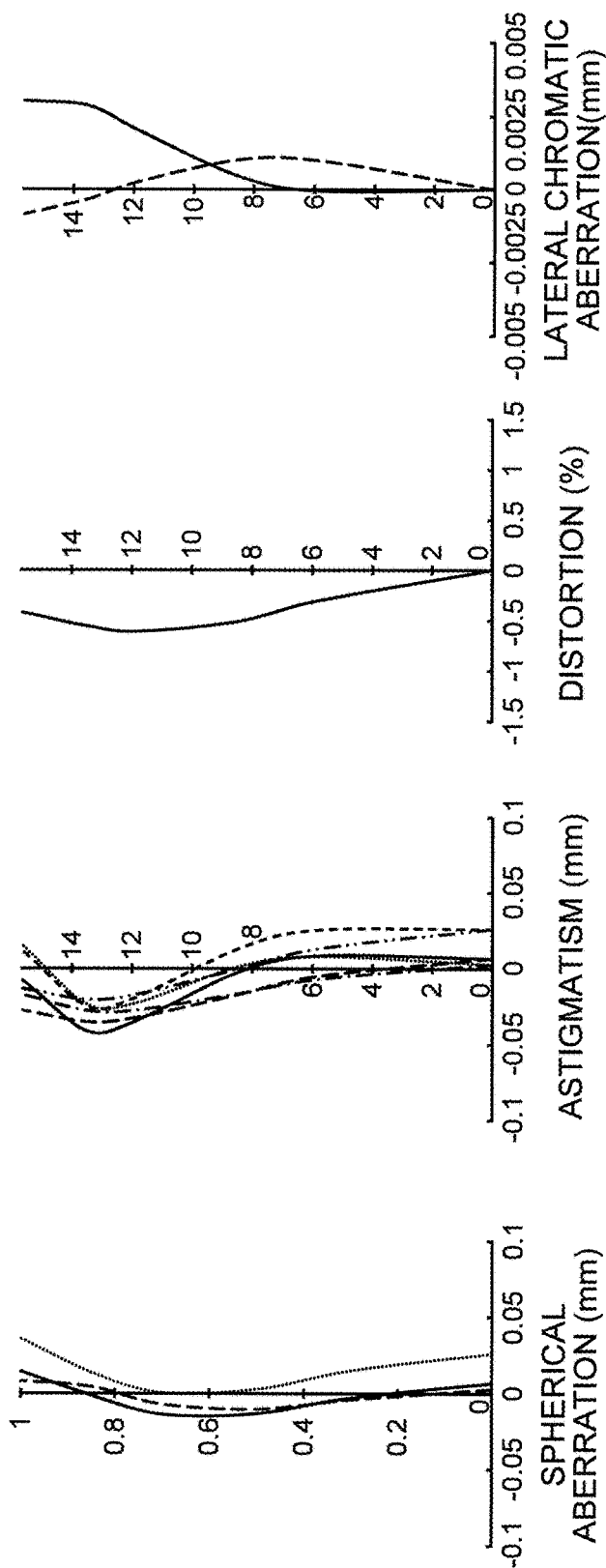

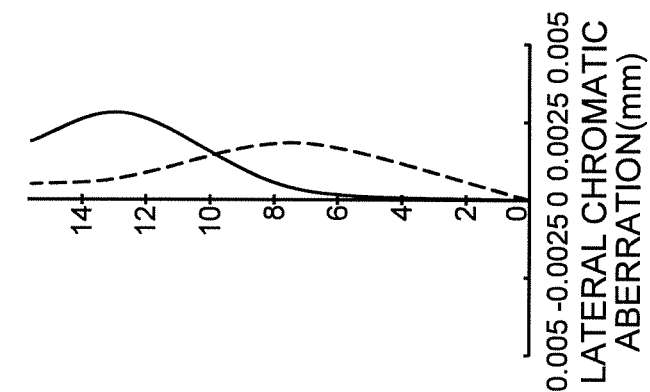
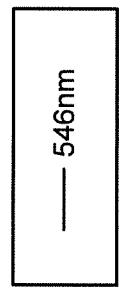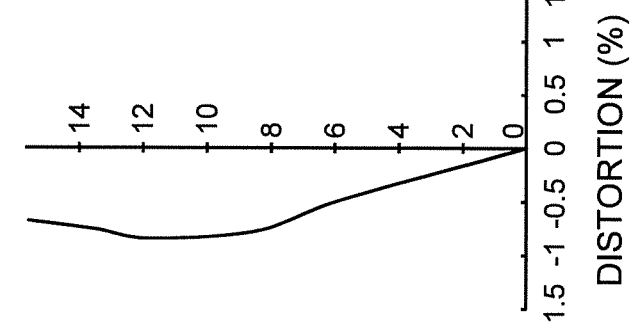
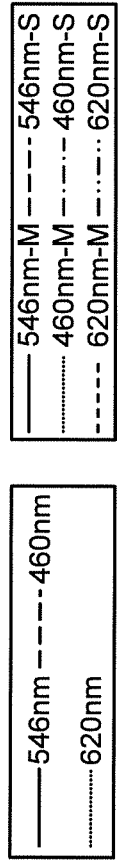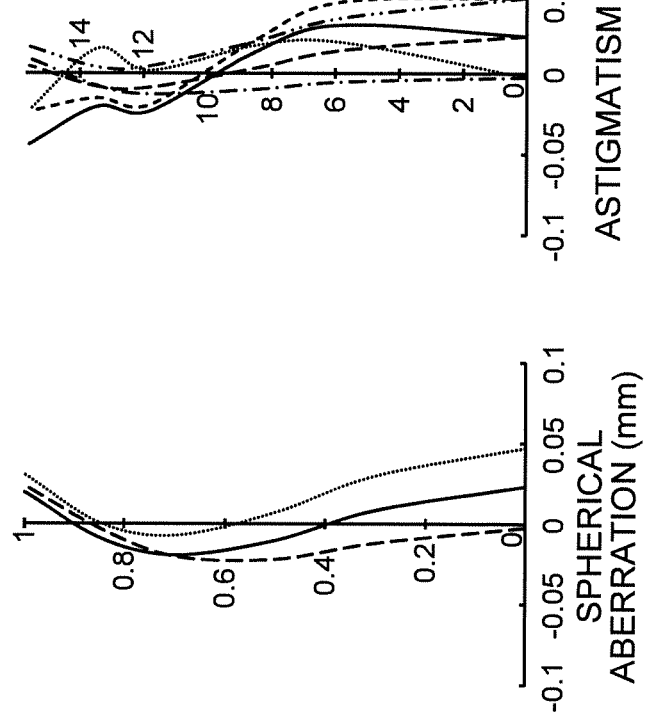

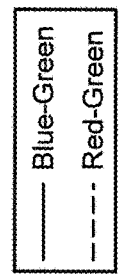
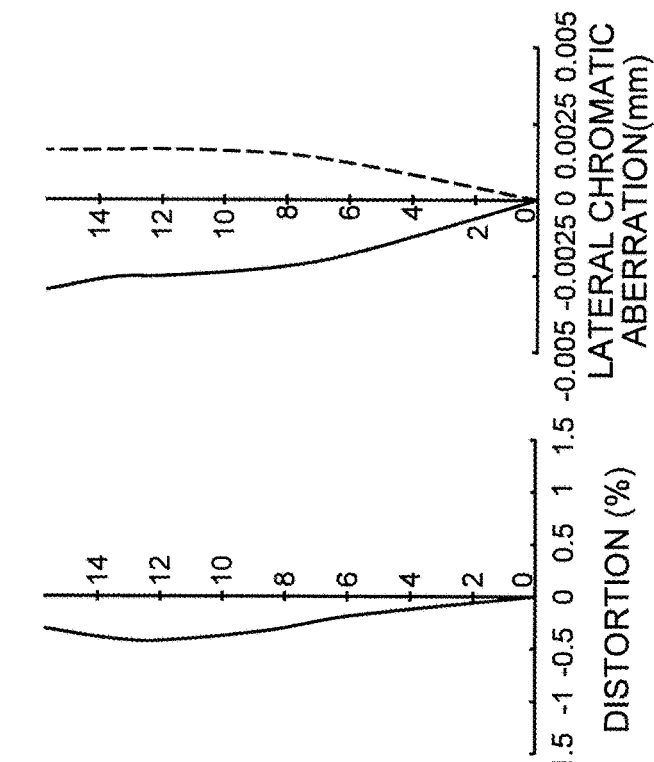
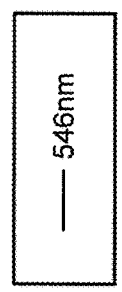
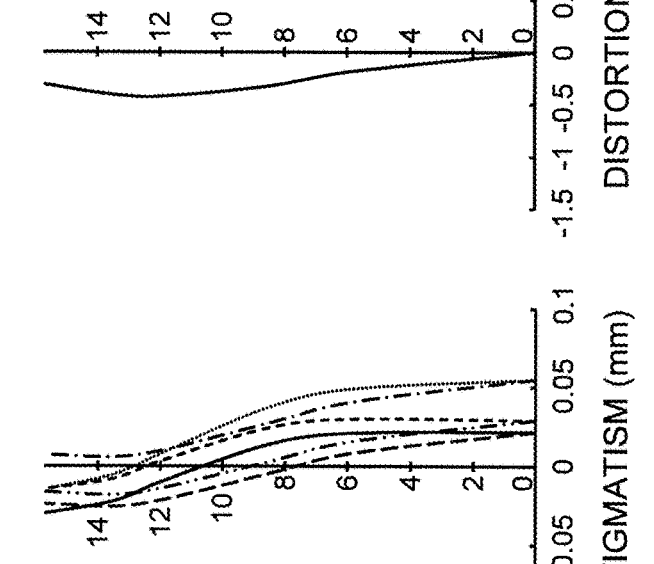
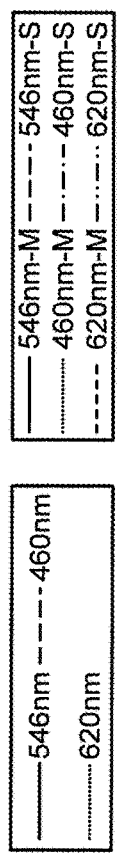
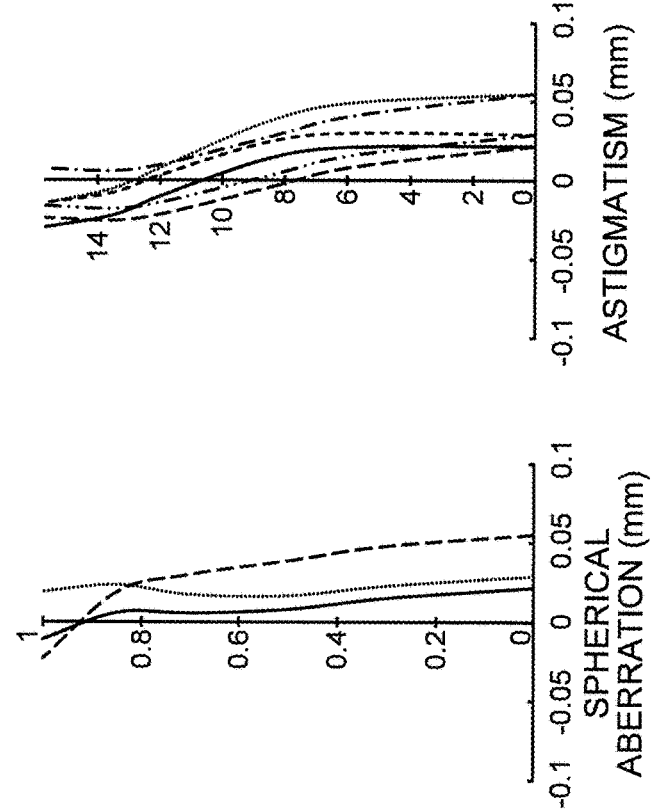

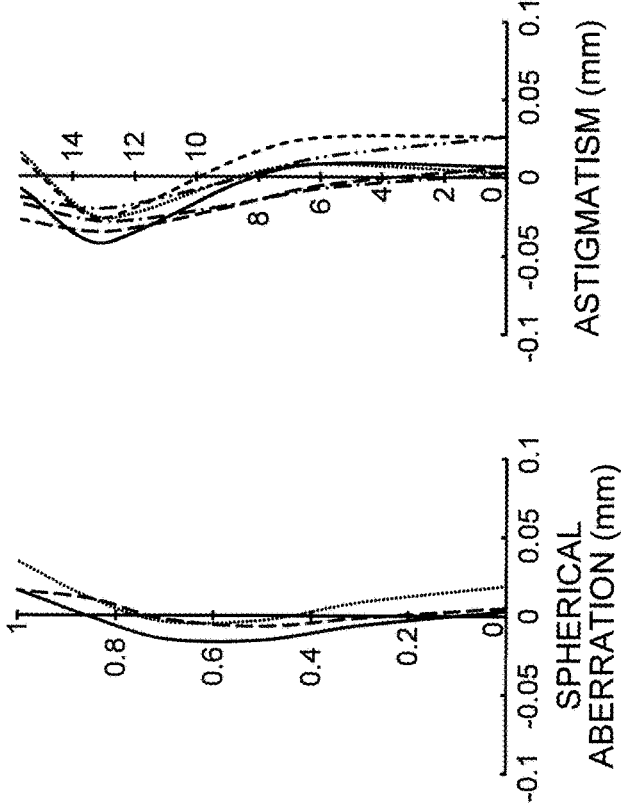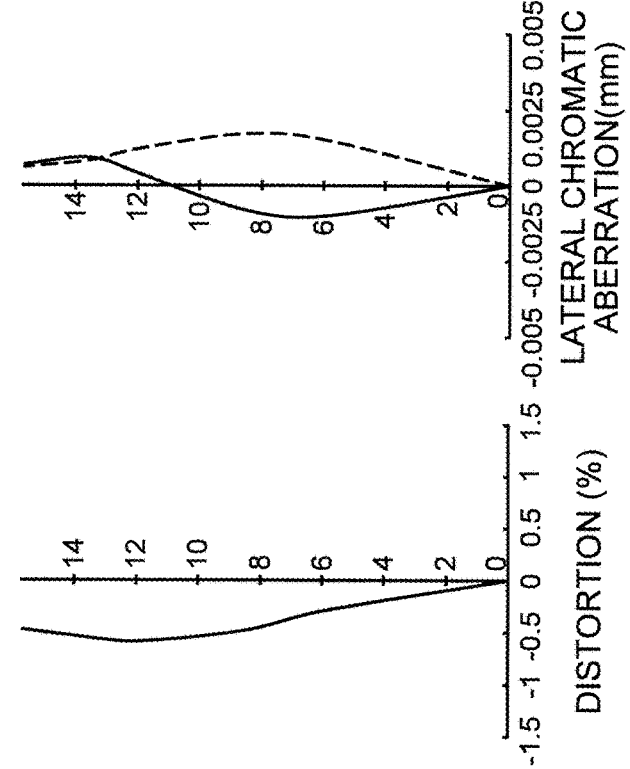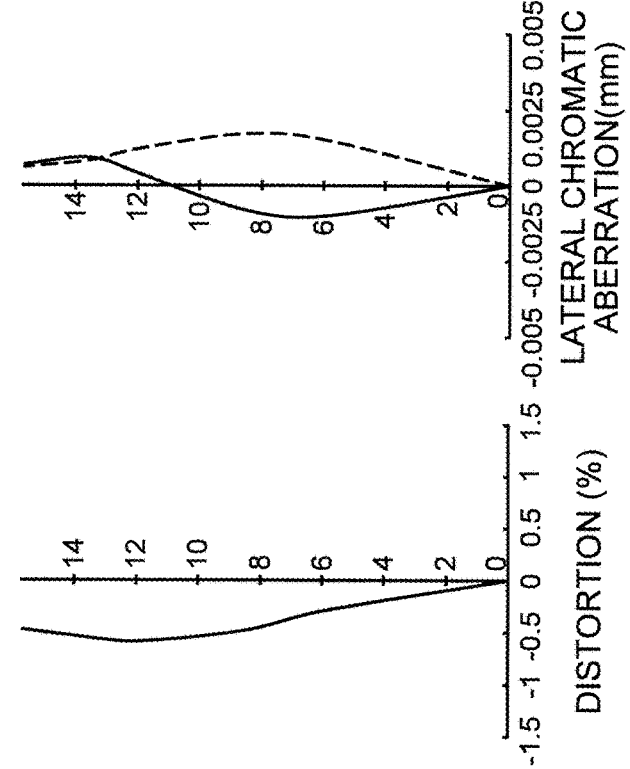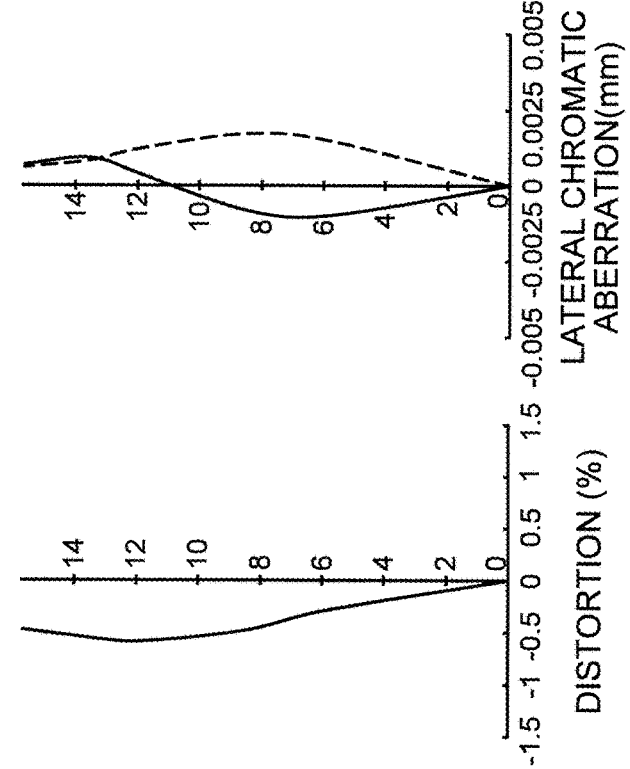
FIG.9A EX1-M-E
FIG.9B EX1-M-E
FIG.9C EX1-M-E
FIG.9D EX1-M-E

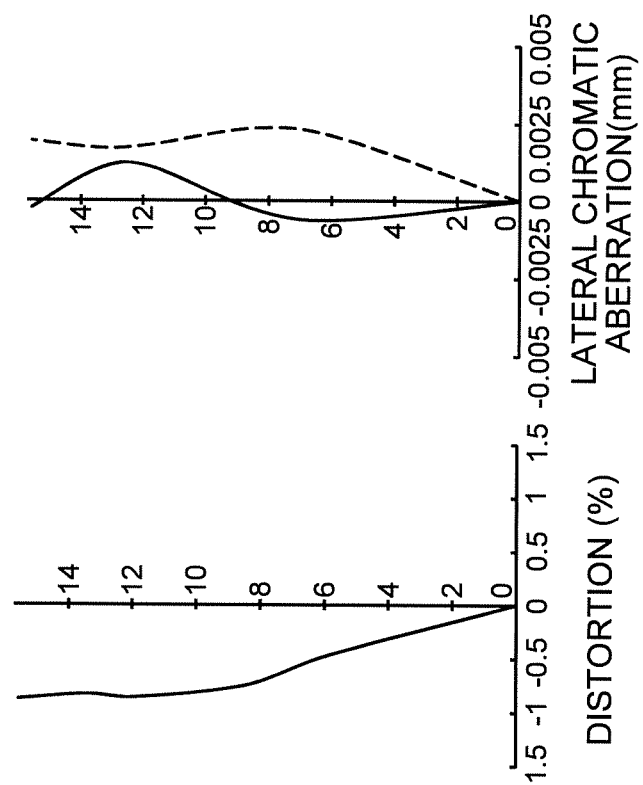
FIG.10A EX1-W-E
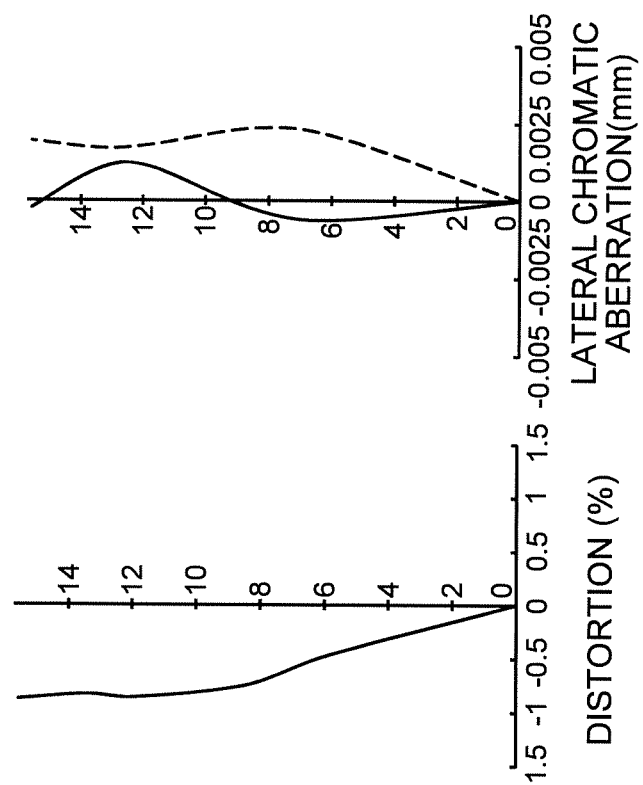
FIG.10B EX1-W-E
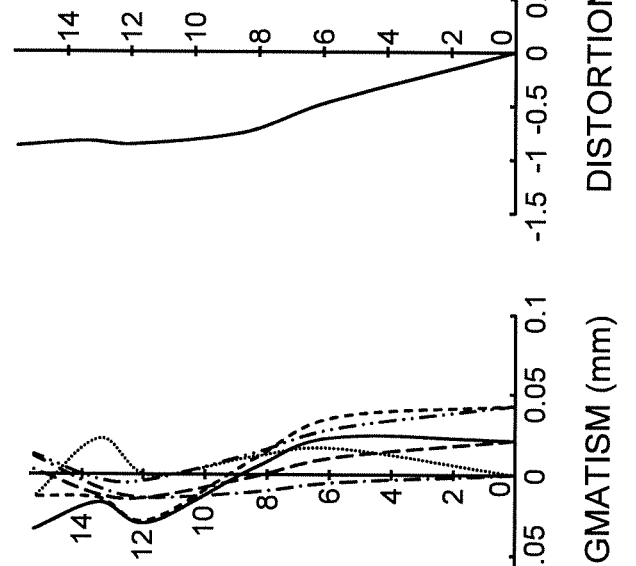
FIG.10C EX1-W-E
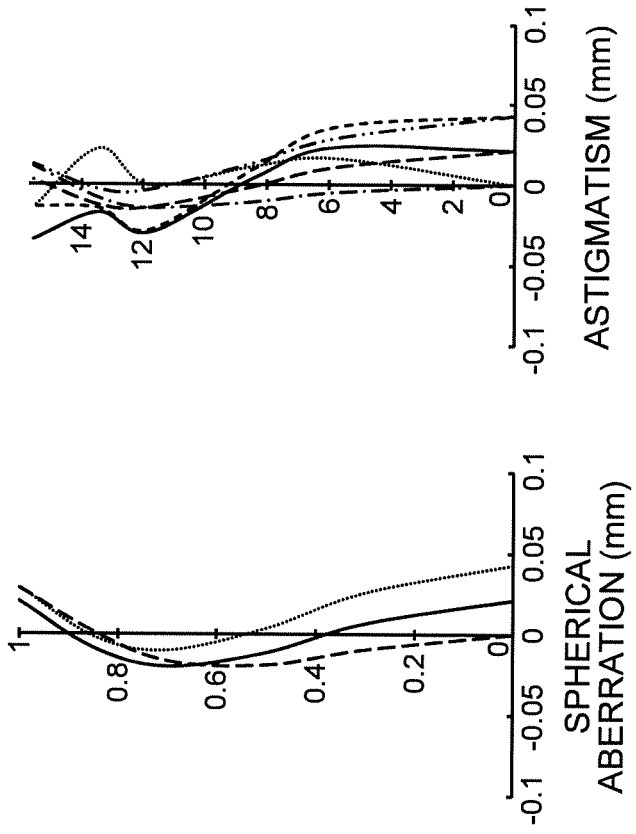
FIG.10D EX1-W-E

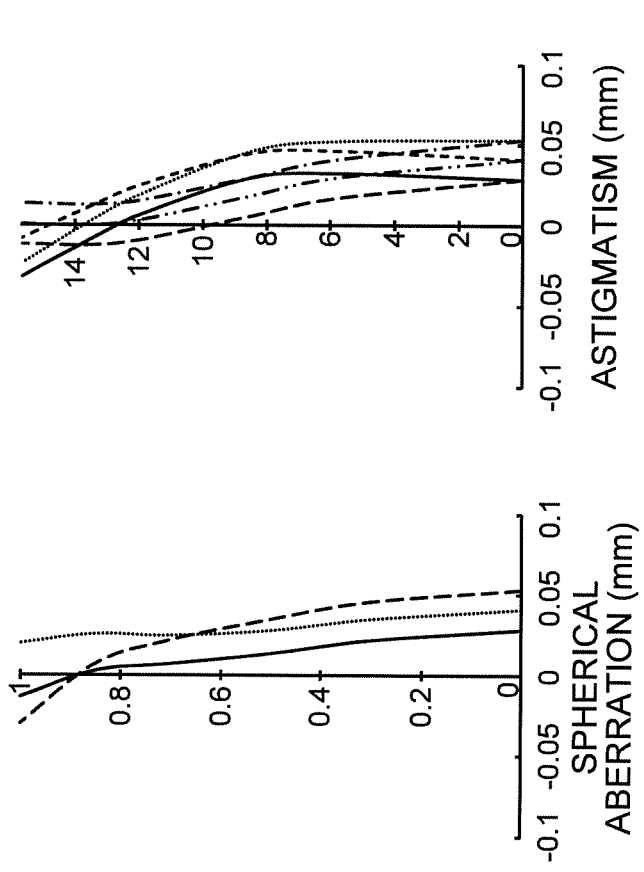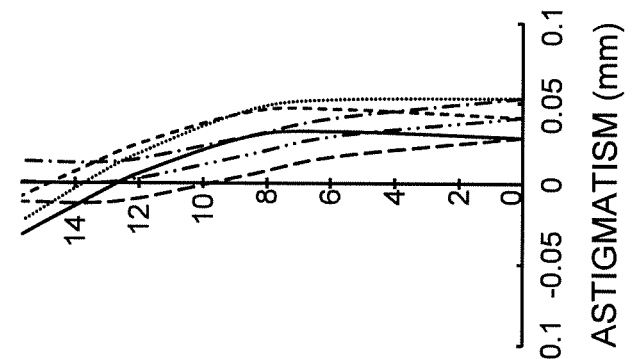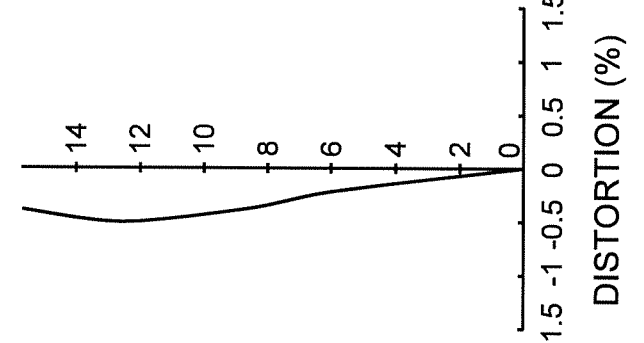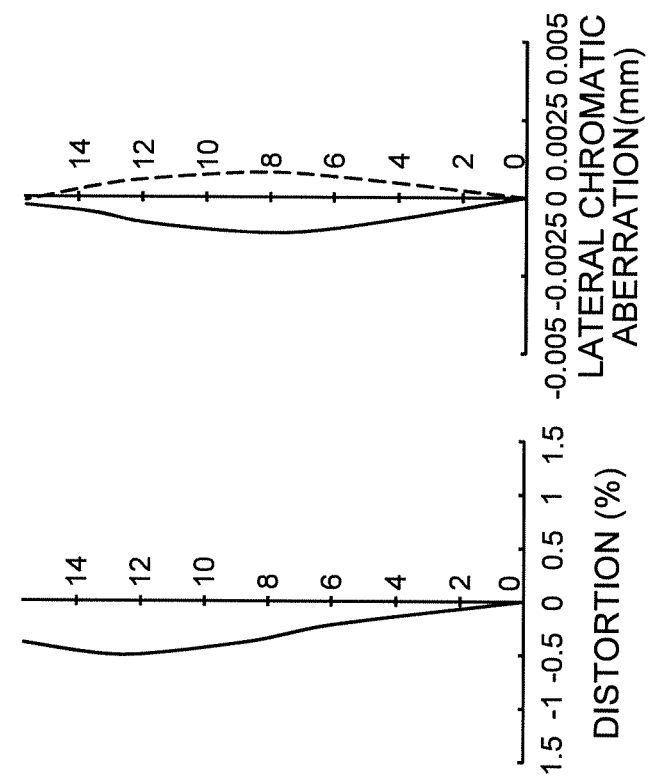

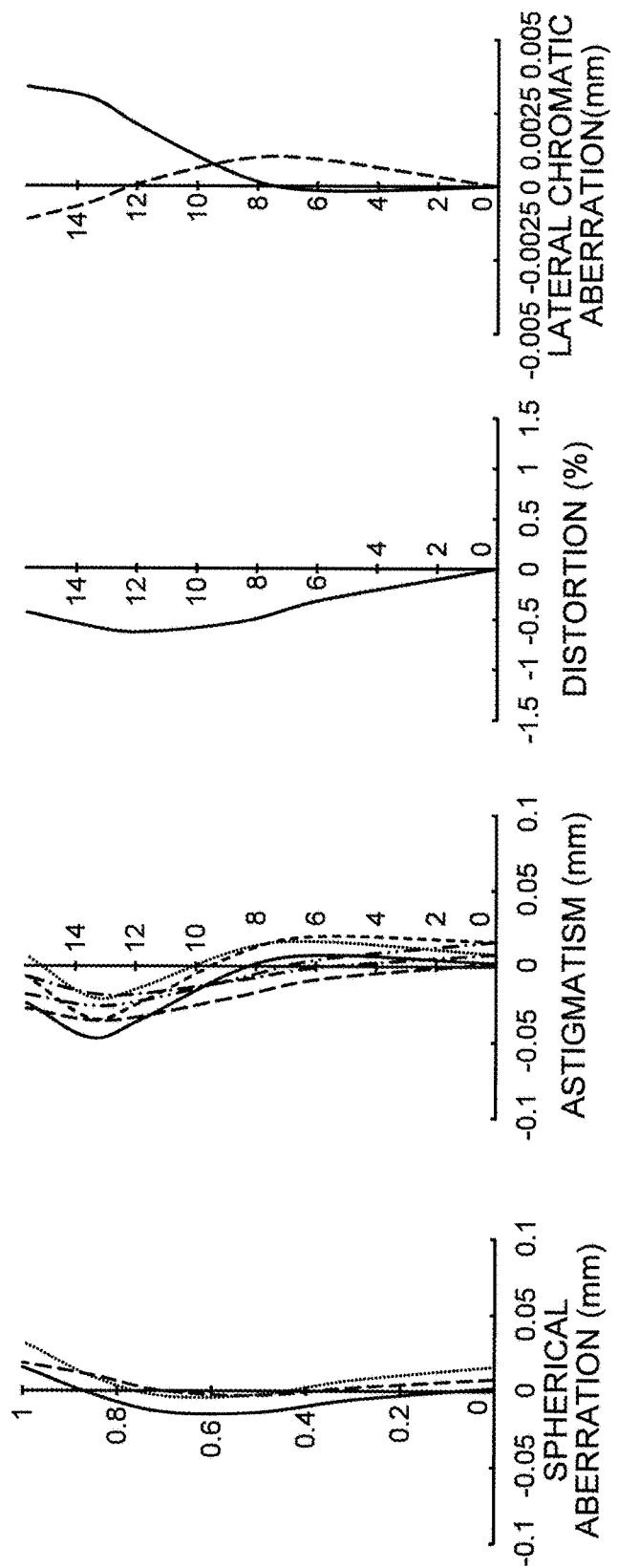

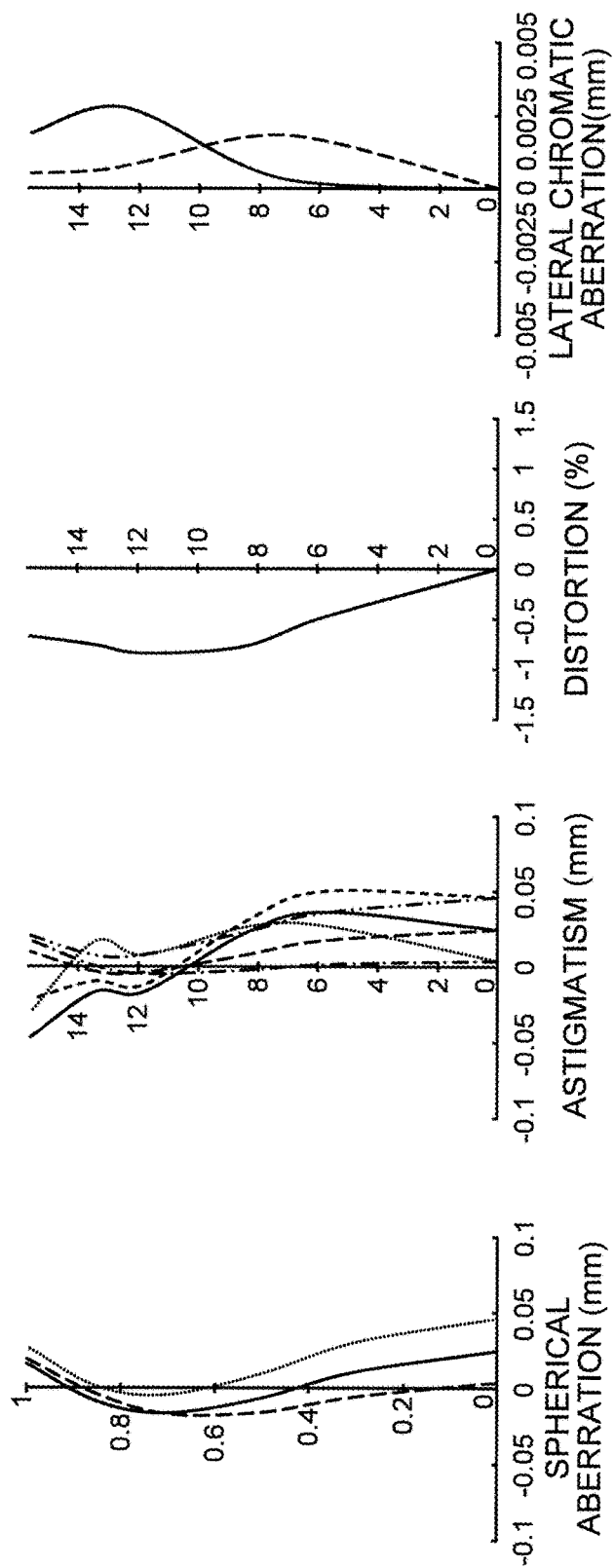

FIG.14A
EX2-T-E
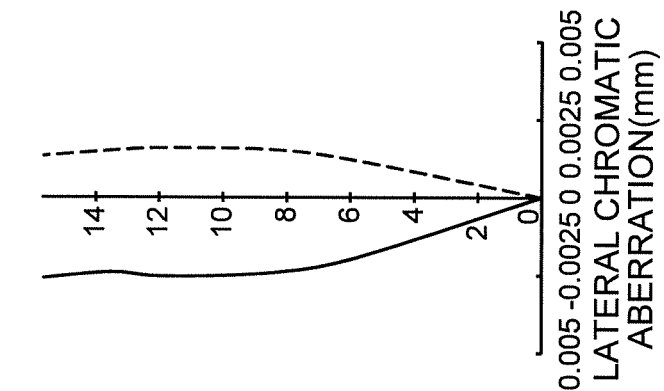
FIG.14B
EX2-T-E
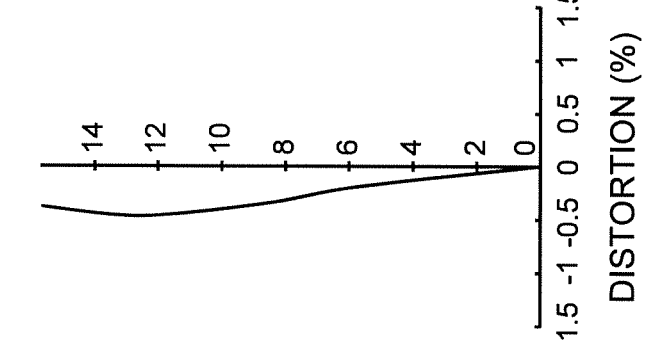
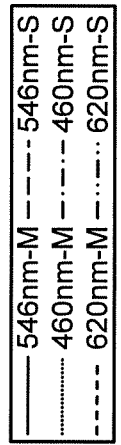
FIG.14C
EX2-T-E
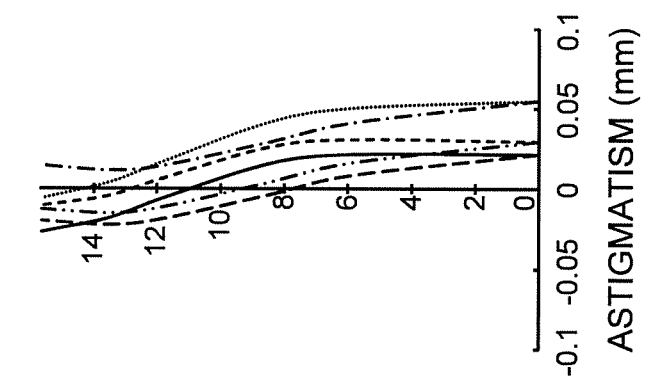
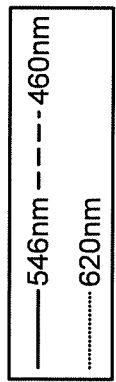
FIG.14D
EX2-T-E
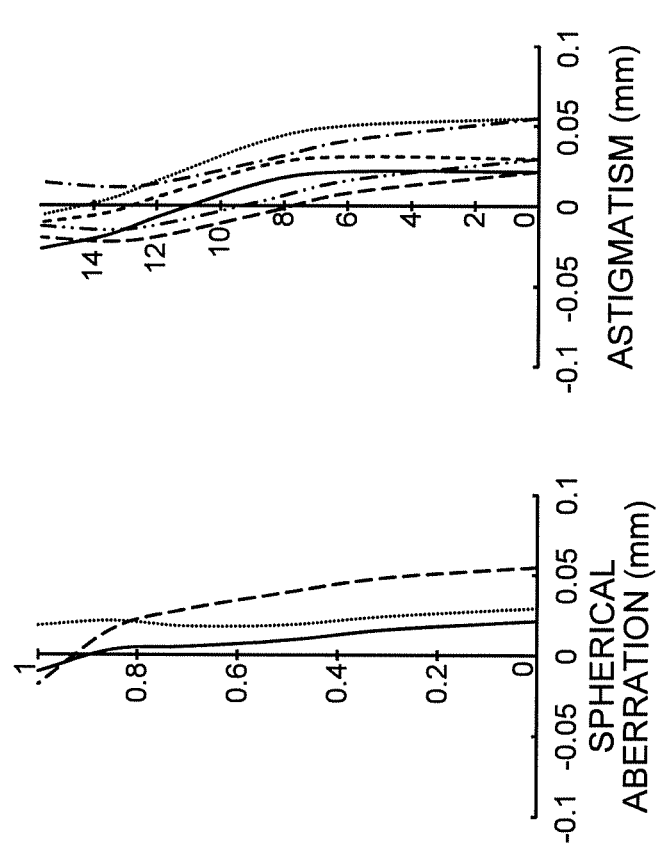

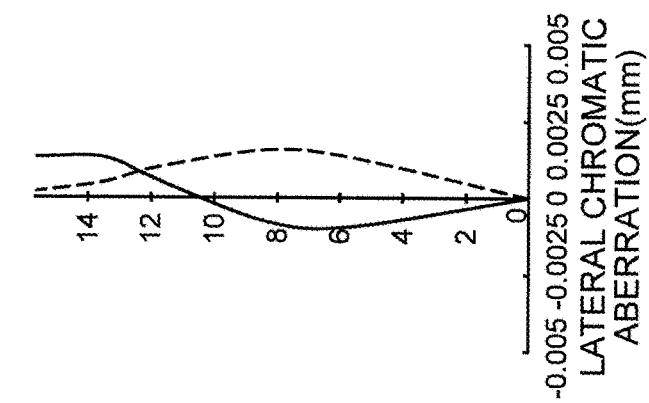
FIG.15A EX2-M-E
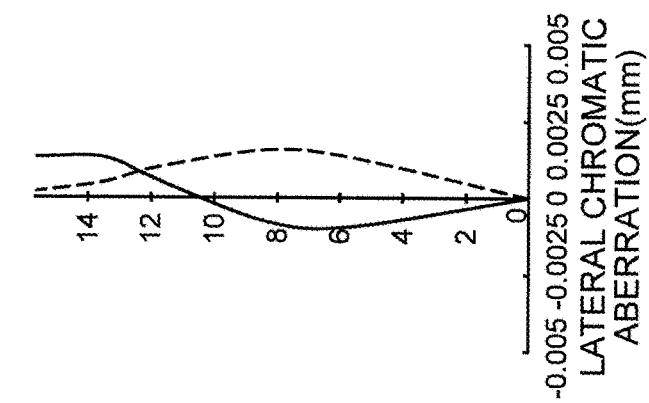
FIG.15B EX2-M-E
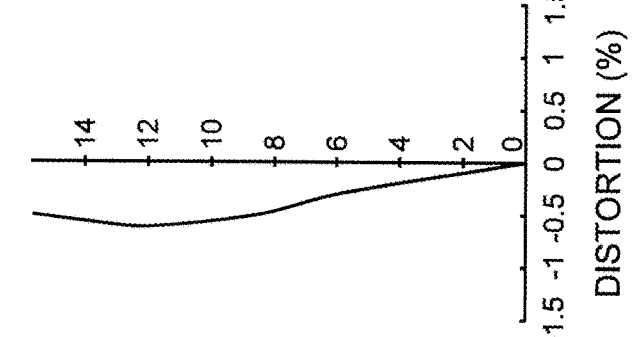
FIG.15C EX2-M-E
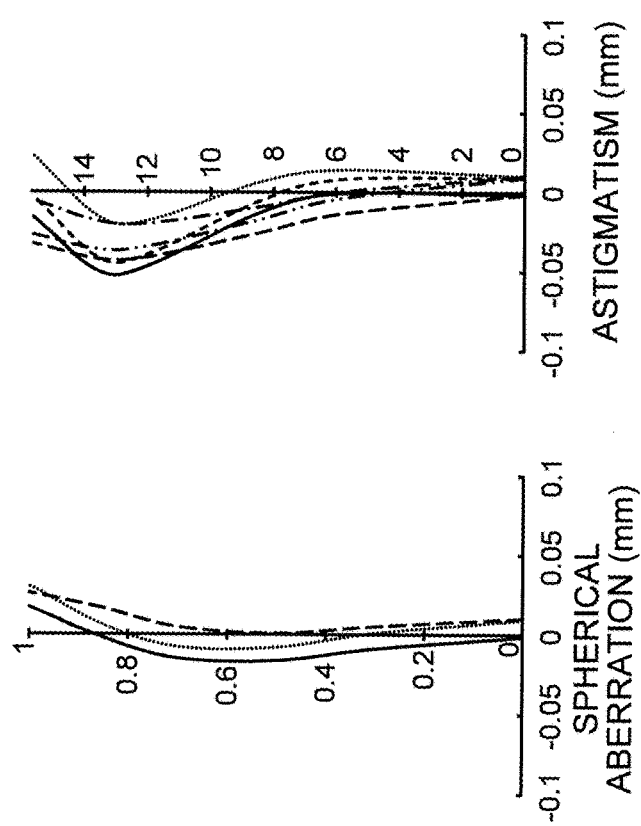
FIG.15D EX2-M-E

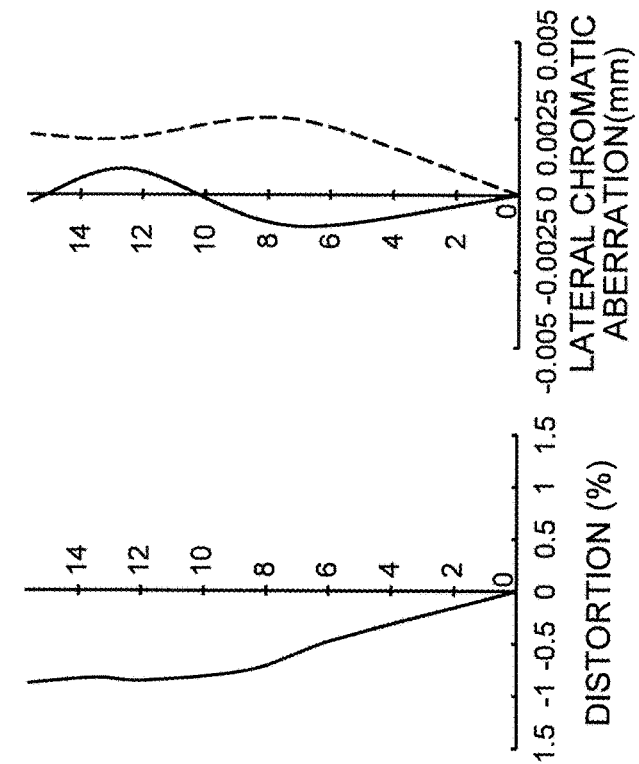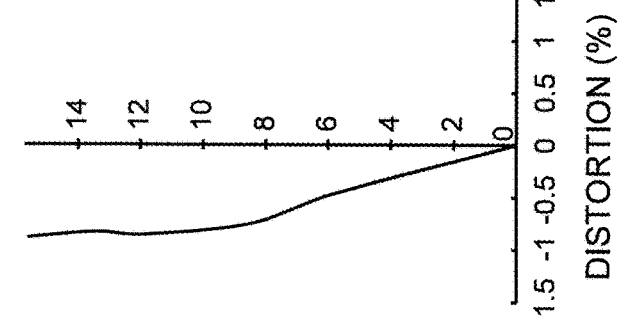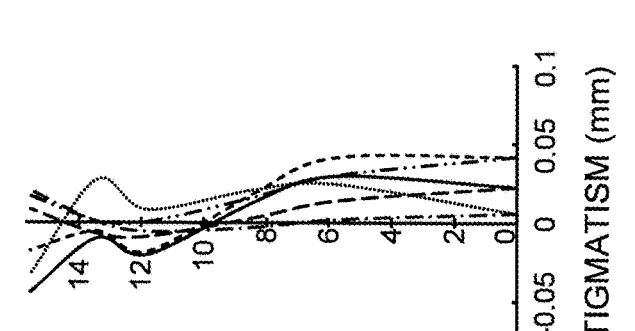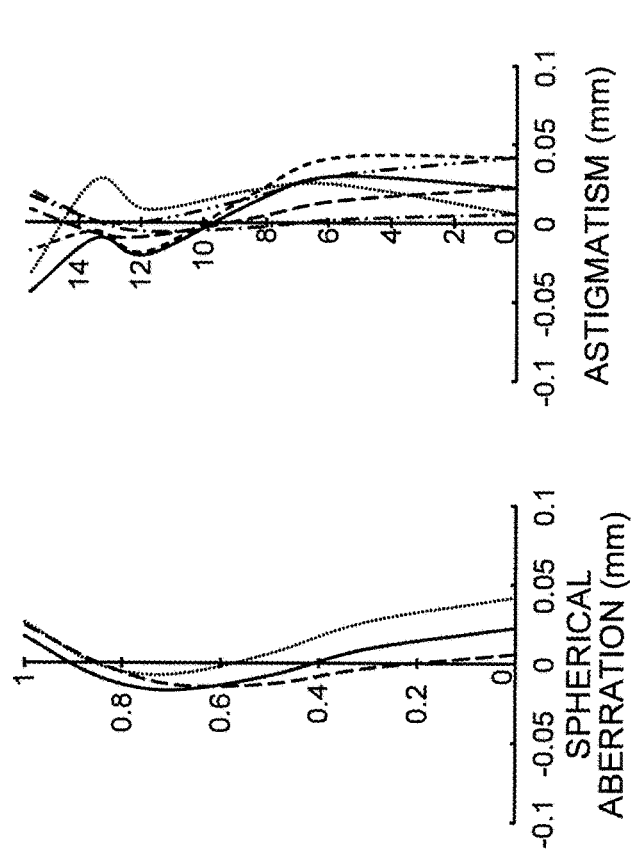

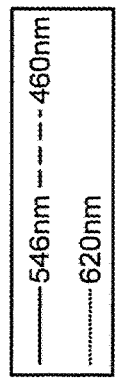
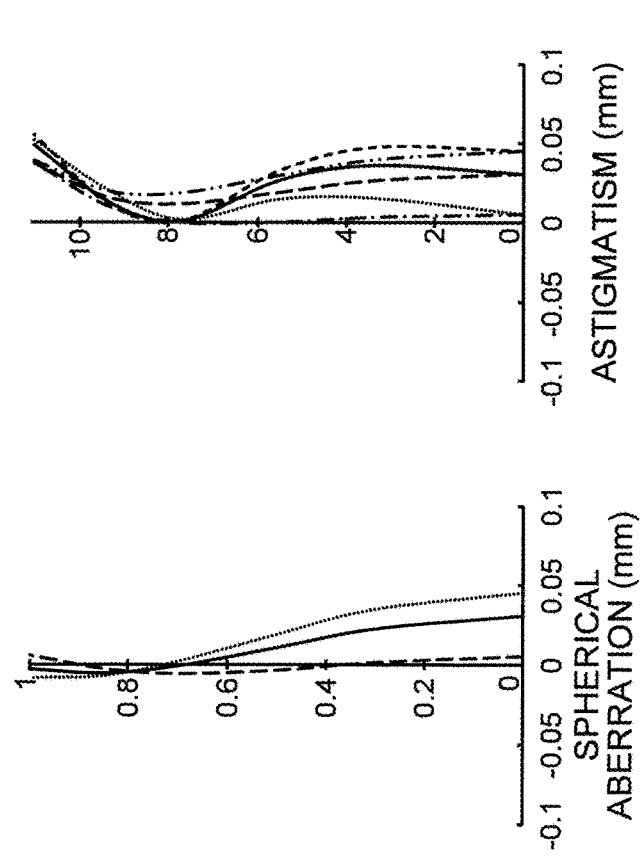
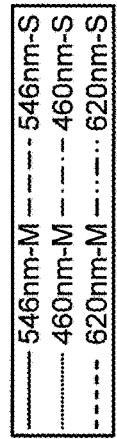
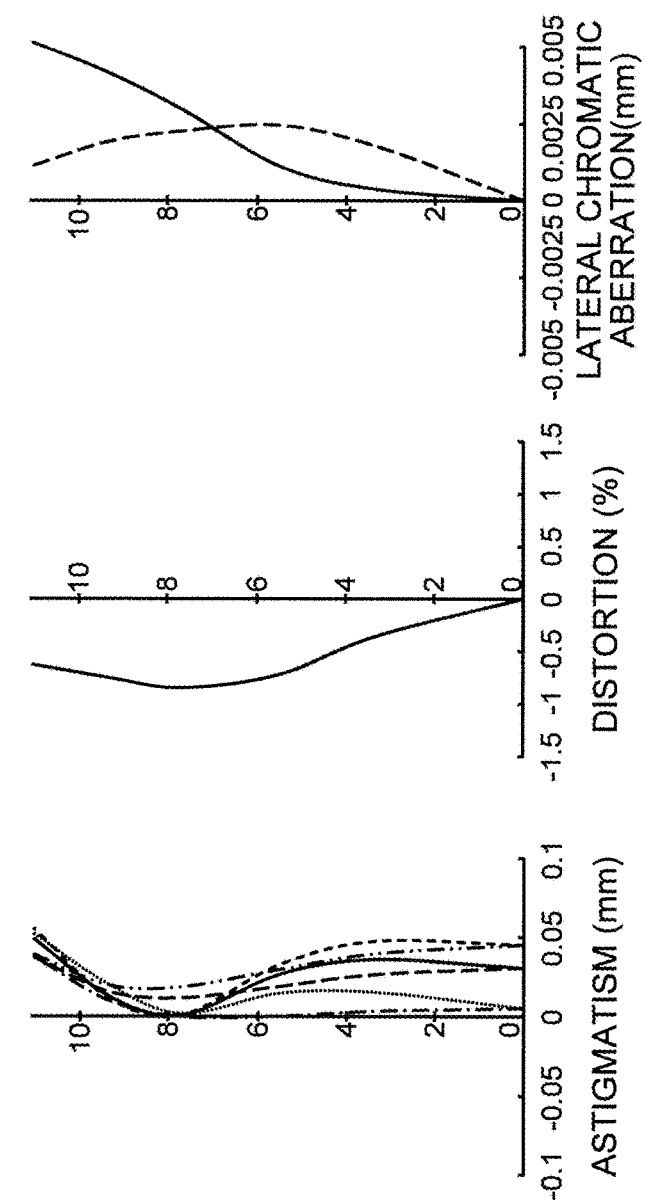
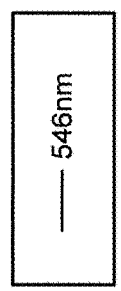
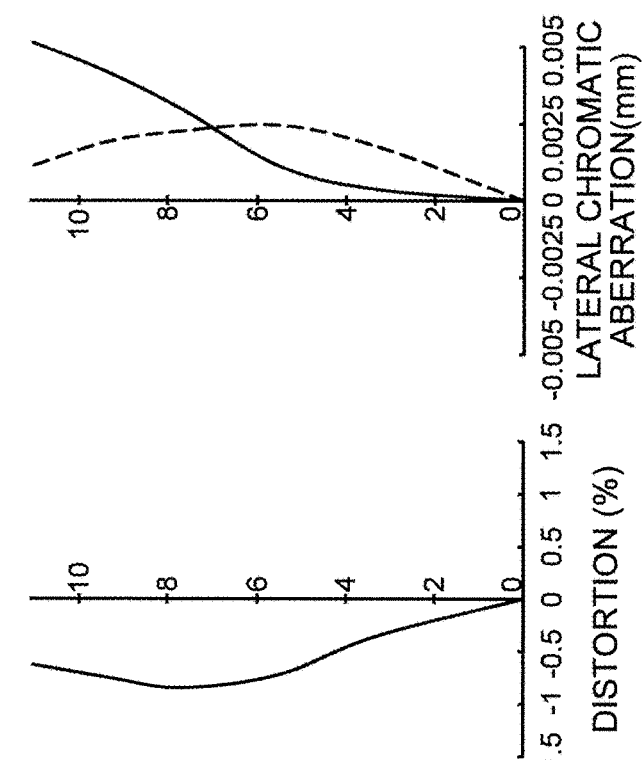
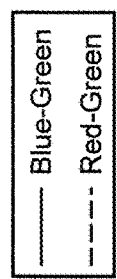
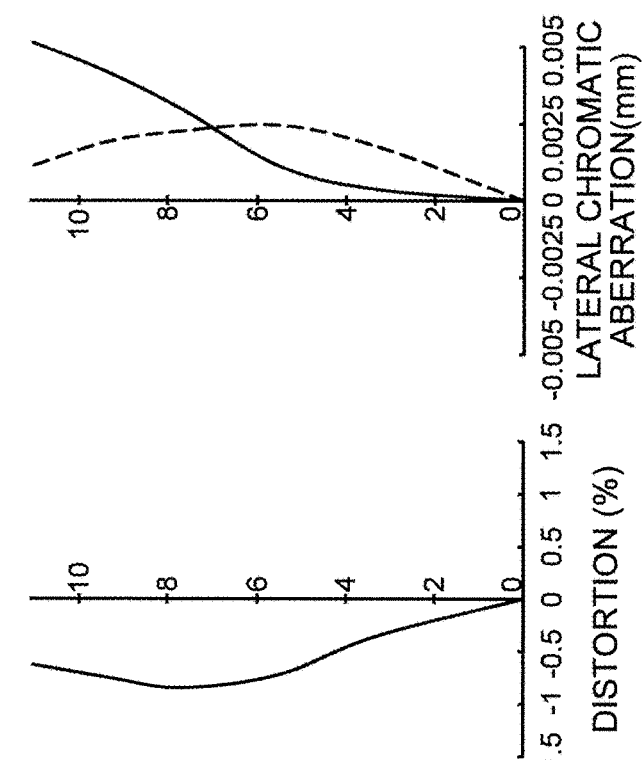

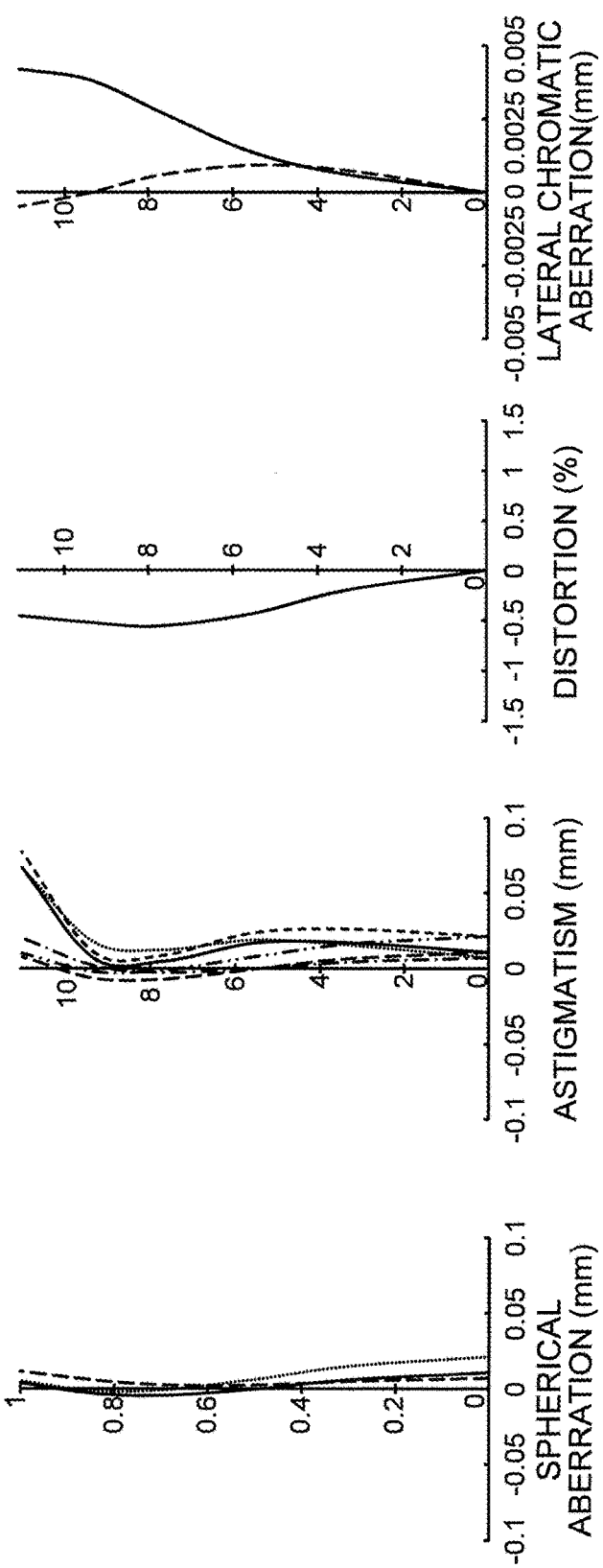

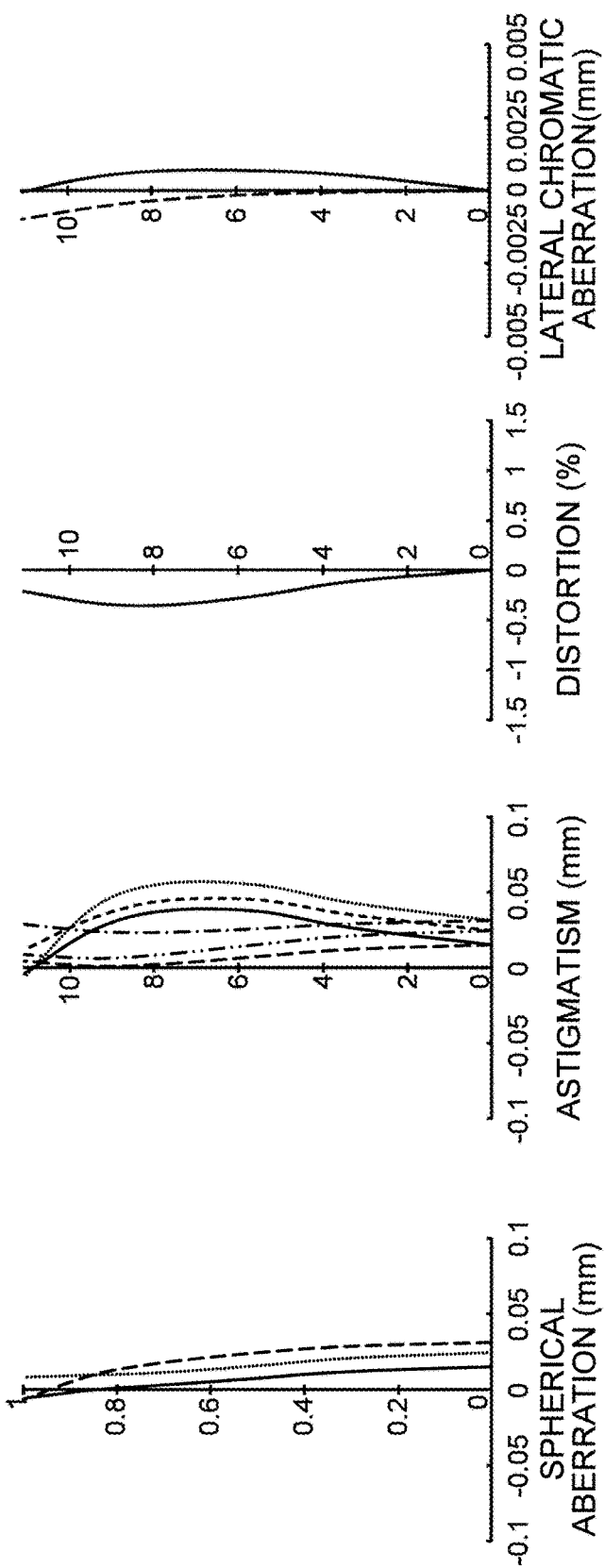

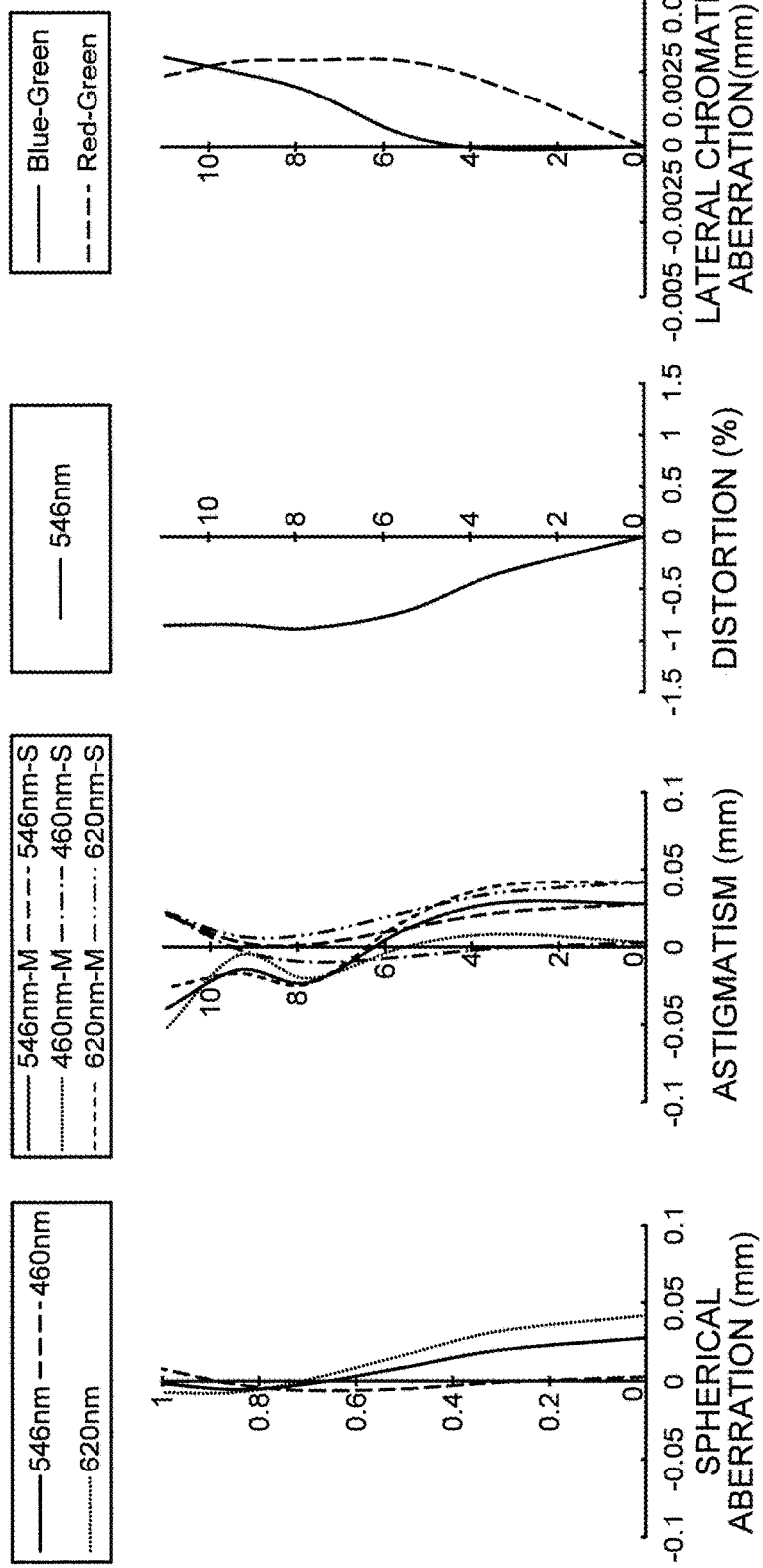

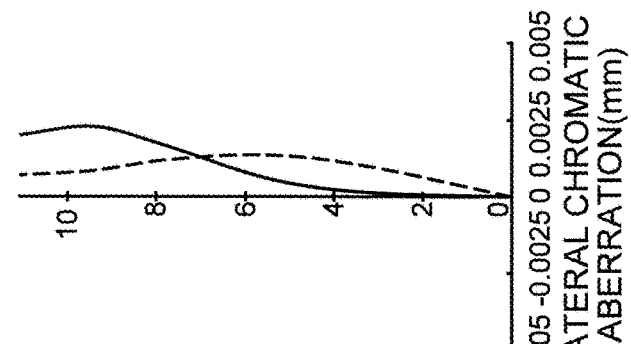
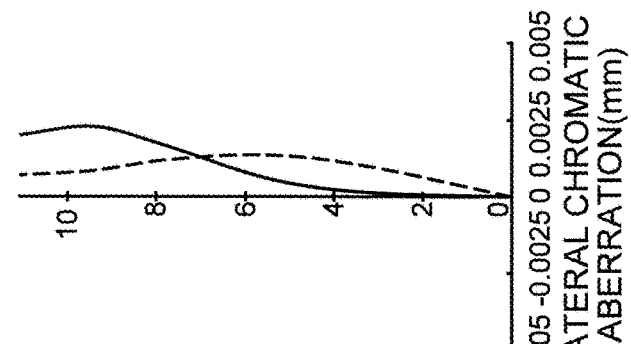
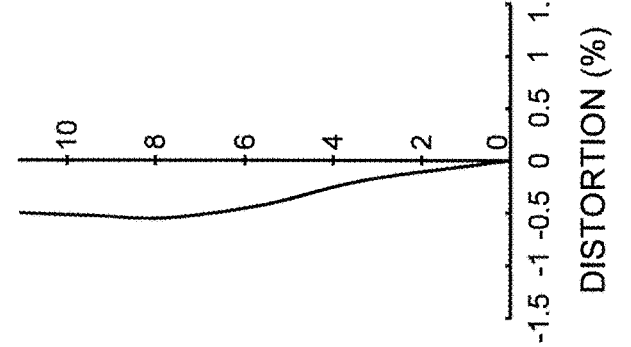
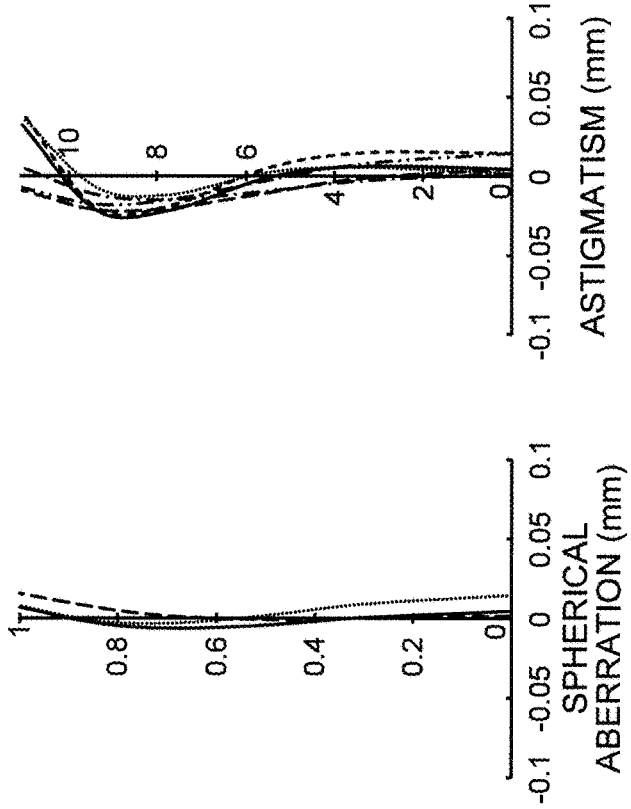

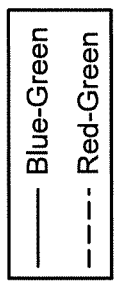
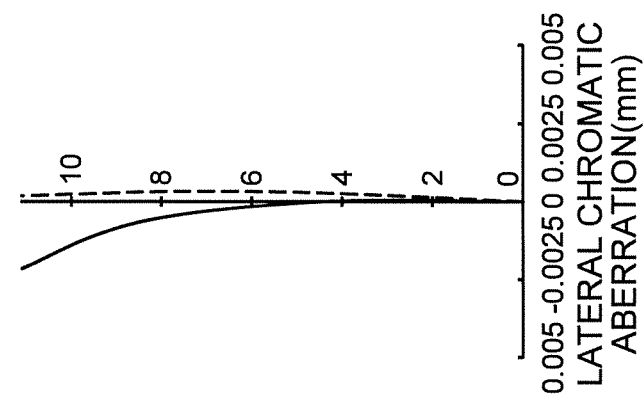
FIG.22A EX3-W-E
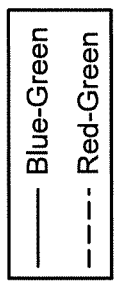
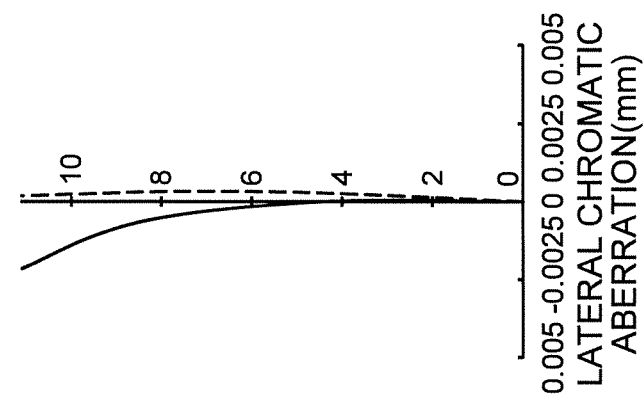
FIG.22B EX3-W-E
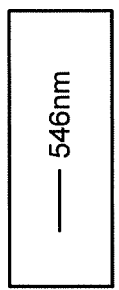
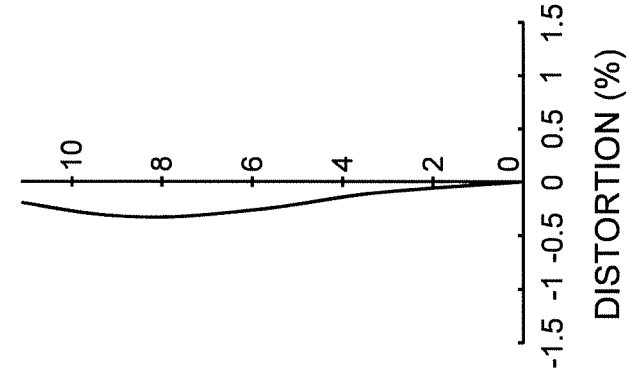
FIG.22C EX3-W-E
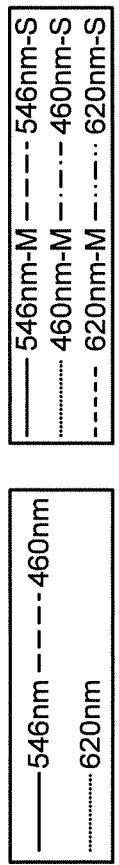
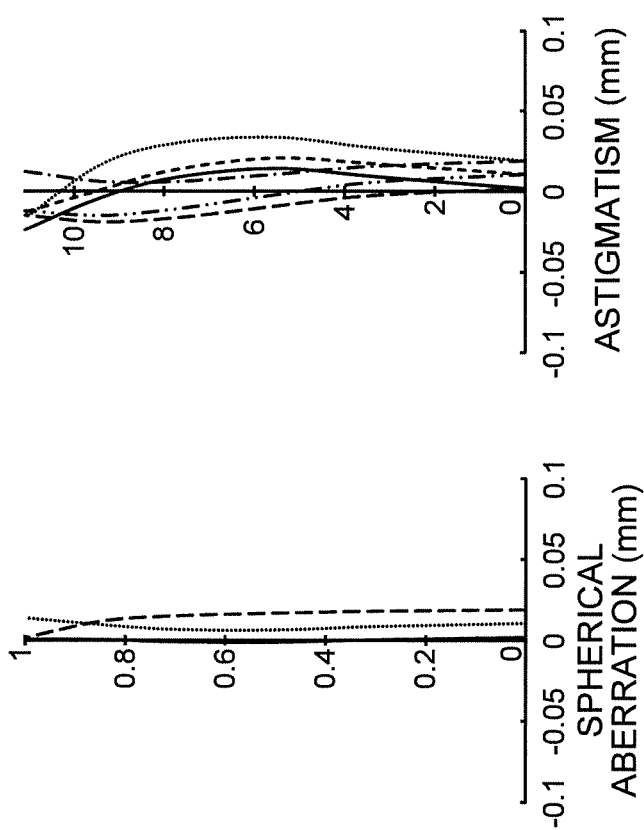
FIG.22D EX3-W-E

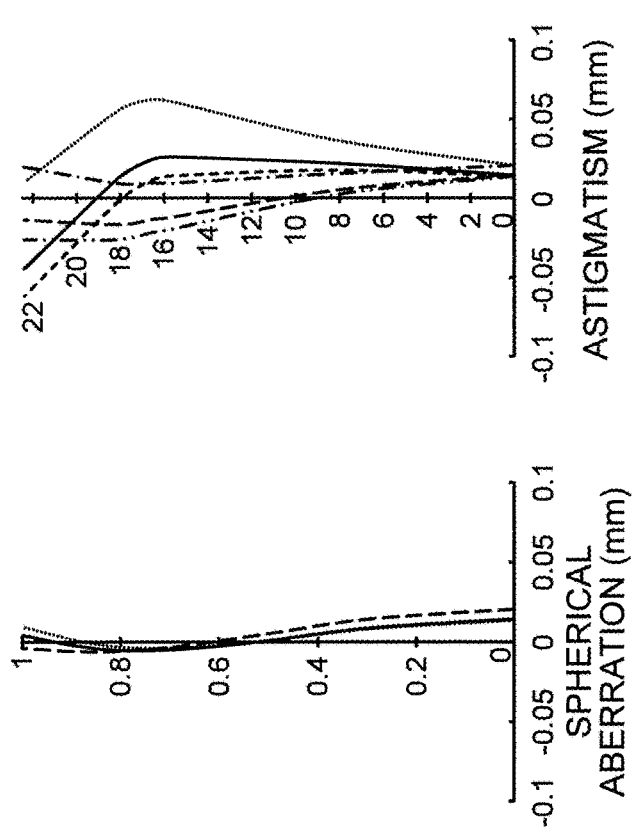
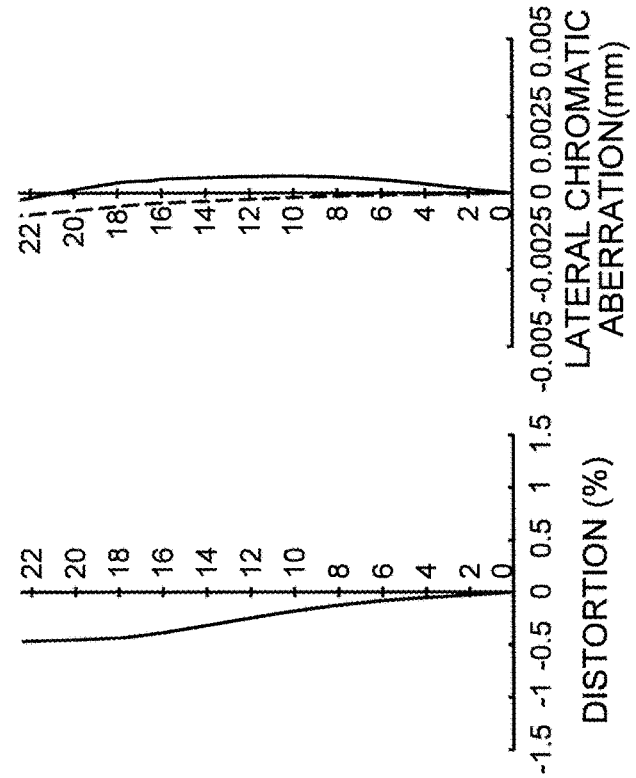
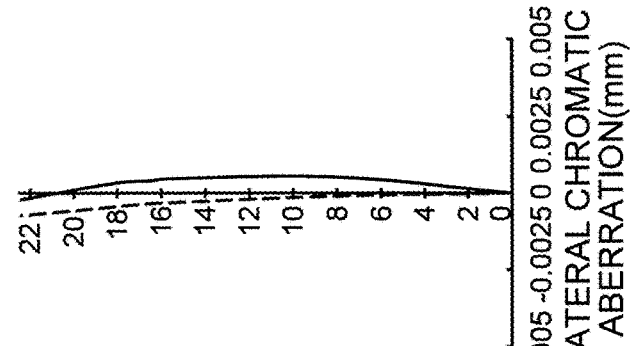
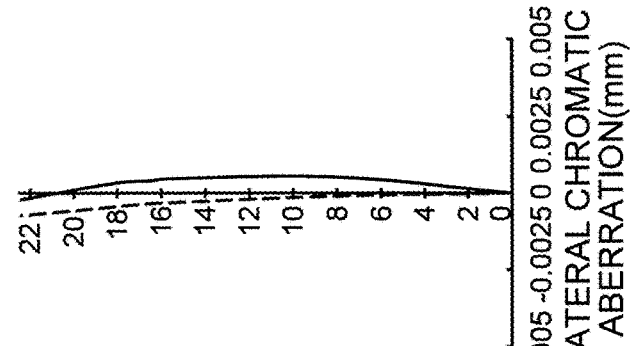

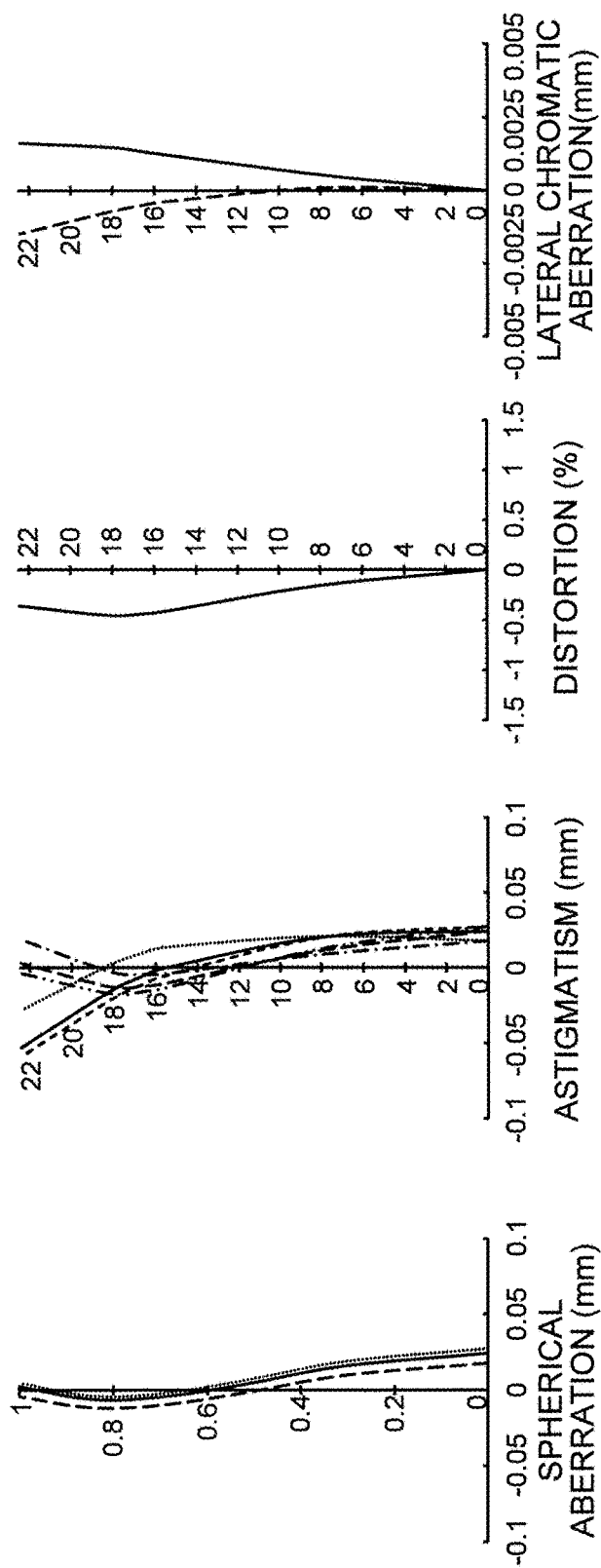

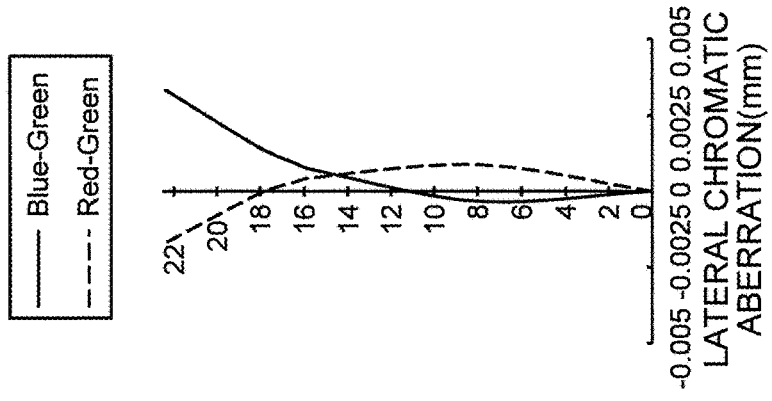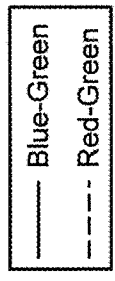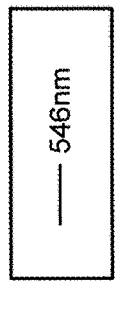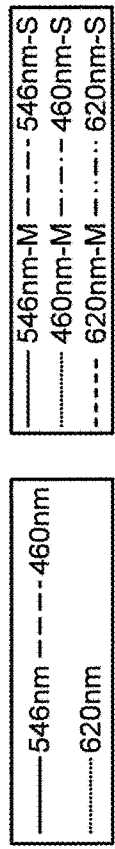

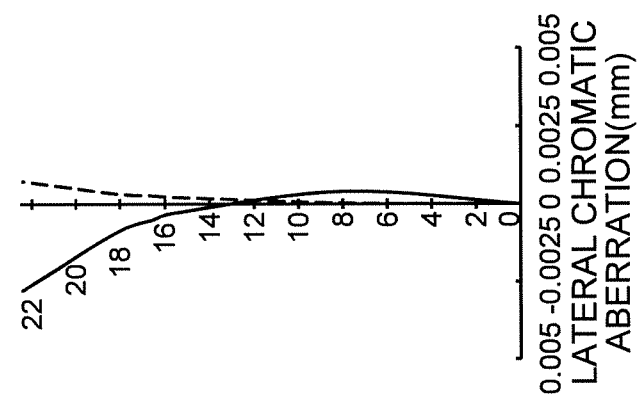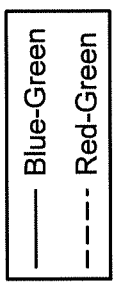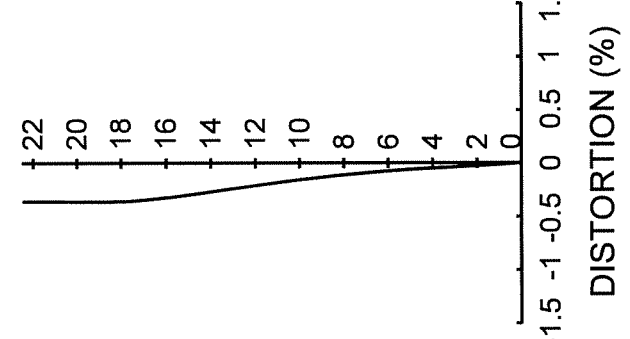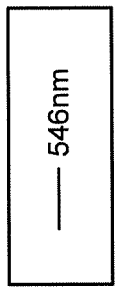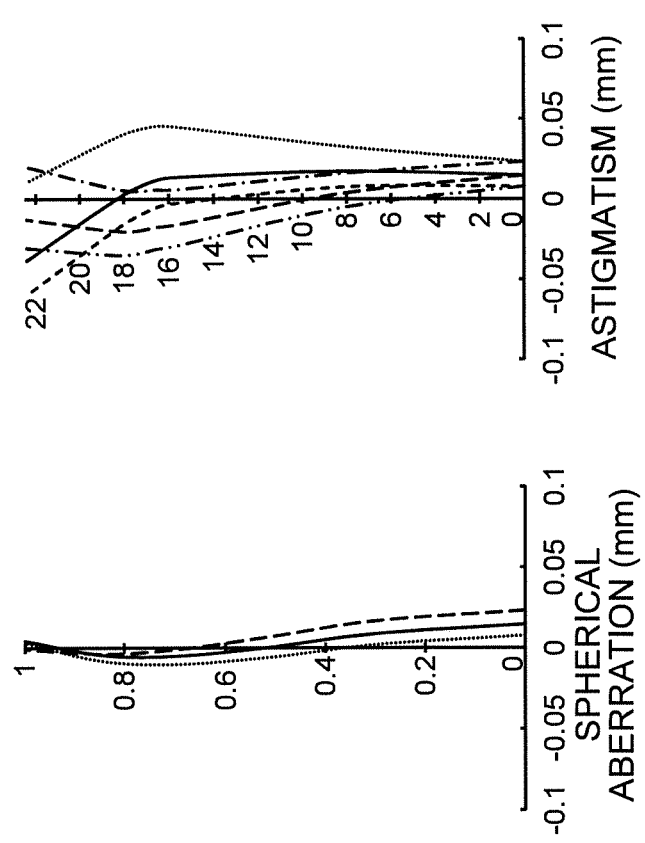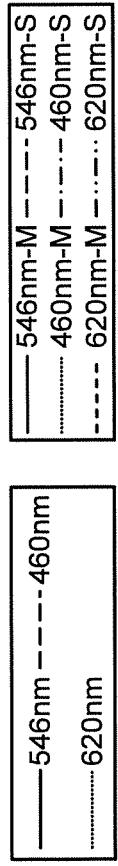

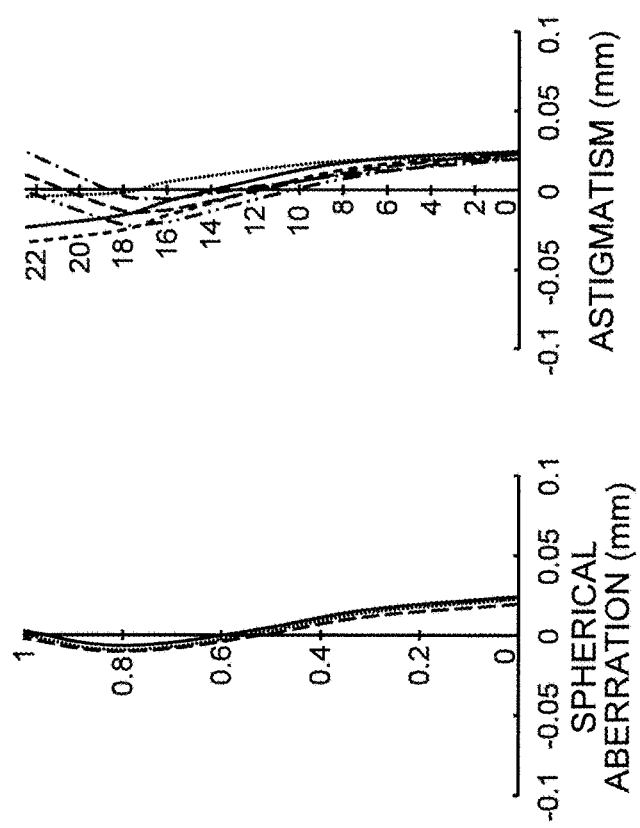
FIG.27D EX4-M-E
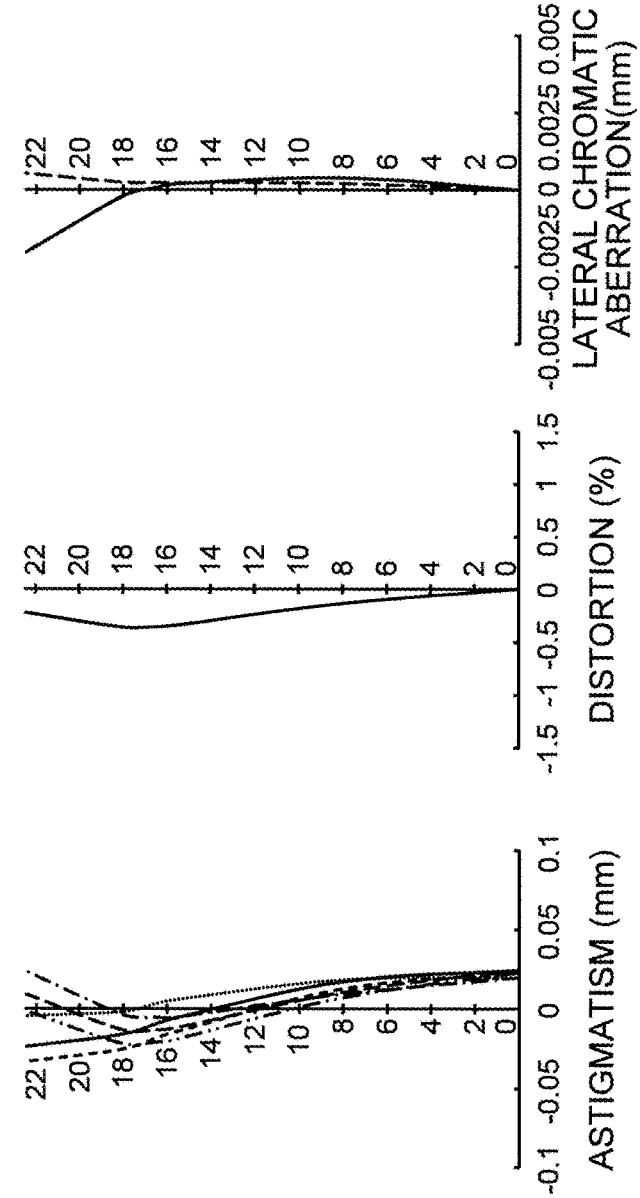
FIG.27C EX4-M-E
FIG.27B EX4-M-E
FIG.27A EX4-M-E

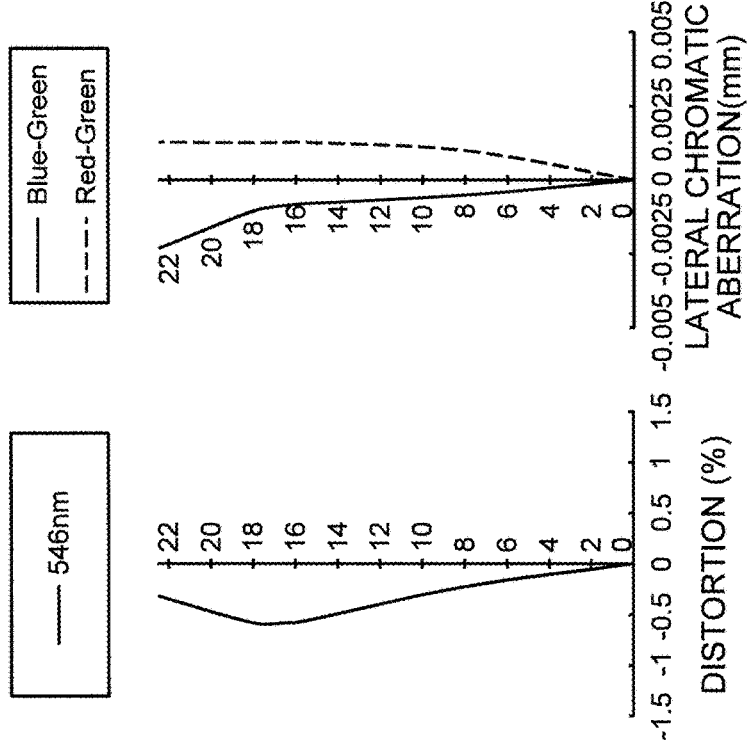

PROJECTION LENS SYSTEM WITH MAGNIFICATION-VARYING CAPABILITY AND PROJECTOR

This application is based on Japanese Patent Application No. 2015-183032 filed on Sep. 16, 2015, the contents of which are hereby incorporated by reference.

BACKGROUND OF THE INVENTION

1. Field of the Invention

The present invention relates to projection lens systems with a magnification-varying capability, and to projectors. More particularly, one or more embodiments of the present invention relates to zoom lens systems for projection that have a wide focus range suitable for projection of an image displayed on an image display device such as a digital micromirror device or an LCD (liquid crystal display) onto a screen on a magnified scale, and to projectors provided with such a zoom lens system.

2. Description of Related Art

Zoom lens systems of a type that is suitable as a projection lens system for projectors are proposed in Patent Documents 1 and 2 identified below. The zoom lens system disclosed in Patent Document 1 has a negative-led six-group design of a negative-negative-positive-negative-positive-positive type or a negative-negative-positive-negative-negative-positive type. The zoom lens system disclosed in Patent Document 2 has a negative-led five-group design of a negative-positive-negative-positive-positive type. The zoom lens system disclosed in Patent Document 1 adopts a focus system in which a first lens group is moved as a whole. On the other hand, the zoom lens system disclosed in Patent Document 2 adopts a so-called floating focus system, in which a plurality of lens groups are moved along different loci to achieve focusing. Specifically, the first lens group is divided into three subgroups, and the foremost two groups are moved along different loci, thereby to achieve focusing while correcting variation of aberrations.

Patent Document 1: WO2014/104083 A1
Patent Document 2: JP-A-H08-005921

In the zoom lens system disclosed in Patent Document 1, variation of longitudinal chromatic aberration and curvature of field resulting from variation of the projection distance cannot be satisfactory corrected; this makes it difficult to give the zoom lens system a wide focus range. In the zoom lens system disclosed in Patent Document 2, as a result of a group with a large diameter being moved, focusing requires an increased torque; this may affect the durability of the focusing mechanism. In the focus systems proposed in Patent Documents 1 and 2, the lens group arranged at the most enlargement side is moved; this may inconveniently cause the lens total length to vary with focusing, leading to a large size in the mechanism that holds the focusing group.

SUMMARY OF THE INVENTION

One or more embodiments of the invention provide a compact projection lens system with so high aberration performance as to be compatible with high-resolution image display devices over a wide focus range, and a projector provided with such a projection lens system.

A projection lens system according to one or more embodiments includes, from the enlargement conjugate side, a first lens group having a negative refractive power and a plurality of lens groups. The projection lens system performs zooming by varying the distances between the lens groups. The first lens group is composed of three subgroups, namely, a 1a-th lens group having a negative refractive power, a 1b-th lens group having a positive or negative refractive power, and a 1c-th lens group having a positive or negative refractive power. During zooming, the first lens group remains stationary on the optical axis. During focusing from the remote distance side to the close distance side, while the 1a-th lens group remains stationary on the optical axis, the 1b-th and 1c-th lens groups move toward the enlargement conjugate side along different loci respectively, and conditional formula (I) below is fulfilled at both the remote and close distance sides:

$$-4.7 < f1/fw < -2.5 \tag{1}$$

where
 f1 represents the focal length of the first lens group; and
 fw represents the focal length of the entire system at the wide-angle end.

A projector according to one or more embodiments includes an image forming device for forming image light and a projection lens system as described above for projecting the image light on a magnified scale.

BRIEF DESCRIPTION OF THE DRAWINGS

FIG. 4 is a lens construction diagram according to one or more embodiments of the invention (Example 4);

FIGS. 5A to 5D are aberration diagrams of Example 1 according to one or more embodiments at the telephoto end during focusing at the close distance (EX1-T-K);

FIGS. 6A to 6D are aberration diagrams of Example 1 according to one or more embodiments at the middle position during focusing at the close distance (EX1-M-K);

FIGS. 7A to 7D are aberration diagrams of Example 1 according to one or more embodiments at the wide-angle end during focusing at the close distance (EX1-W-K);

FIGS. 8A to 8D are aberration diagrams of Example 1 according to one or more embodiments at the telephoto end during focusing at the remote distance (EX1-T-E);

FIGS. 9A to 9D are aberration diagrams of Example 1 according to one or more embodiments at the middle position during focusing at the remote distance (EX1-M-E);

FIGS. 10A to 10D are aberration diagrams of Example 1 according to one or more embodiments at the wide-angle end during focusing at the remote distance (EX1-W-E);

FIGS. 11A to 11D are aberration diagrams of Example 2 according to one or more embodiments at the telephoto end during focusing at the close distance (EX2-T-K);

FIGS. 12A to 12D are aberration diagrams of Example 2 according to one or more embodiments at the middle position during focusing at the close distance (EX2-M-K);

FIGS. 13A to 13D are aberration diagrams of Example 2 according to one or more embodiments at the wide-angle end during focusing at the close distance (EX2-W-K);

FIGS. 14A to 14D are aberration diagrams of Example 2 according to one or more embodiments at the telephoto end during focusing at the remote distance (EX2-T-E);

FIGS. 15A to 15D are aberration diagrams of Example 2 according to one or more embodiments at the middle position during focusing at the remote distance (EX2-M-E);

FIGS. 16A to 16D are aberration diagrams of Example 2 according to one or more embodiments at the wide-angle end during focusing at the remote distance (EX2-W-E);

FIGS. 17A to 17D are aberration diagrams of Example 3 according to one or more embodiments at the telephoto end during focusing at the close distance (EX3-T-K);

FIGS. 18A to 18D are aberration diagrams of Example 3 according to one or more embodiments at the middle position during focusing at the close distance (EX3-M-K);

FIGS. 19A to 19D are aberration diagrams of Example 3 according to one or more embodiments at the wide-angle end during focusing at the close distance (EX3-W-K);

FIGS. 20A to 20D are aberration diagrams of Example 3 according to one or more embodiments at the telephoto end during focusing at the remote distance (EX3-T-E);

FIGS. 21A to 21D are aberration diagrams of Example 3 according to one or more embodiments at the middle position during focusing at the remote distance (EX3-M-E);

FIGS. 22A to 22D are aberration diagrams of Example 3 according to one or more embodiments at the wide-angle end during focusing at the remote distance (EX3-W-E);

FIGS. 23A to 23D are aberration diagrams of Example 4 according to one or more embodiments at the telephoto end during focusing at the close distance (EX4-T-K);

FIGS. 24A to 24D are aberration diagrams of Example 4 according to one or more embodiments at the middle position during focusing at the close distance (EX4-M-K);

FIGS. 25A to 25D are aberration diagrams of Example 4 according to one or more embodiments at the wide-angle end during focusing at the close distance (EX4-W-K);

FIGS. 26A to 26D are aberration diagrams of Example 4 according to one or more embodiments at the telephoto end during focusing at the remote distance (EX4-T-E);

FIGS. 27A to 27D are aberration diagrams of Example 4 according to one or more embodiments at the middle position during focusing at the remote distance (EX4-M-E);

FIGS. 28A to 28D are aberration diagrams of Example 4 according to one or more embodiments at the wide-angle end during focusing at the remote distance (EX4-W-E)

DETAILED DESCRIPTION

Figure 1:
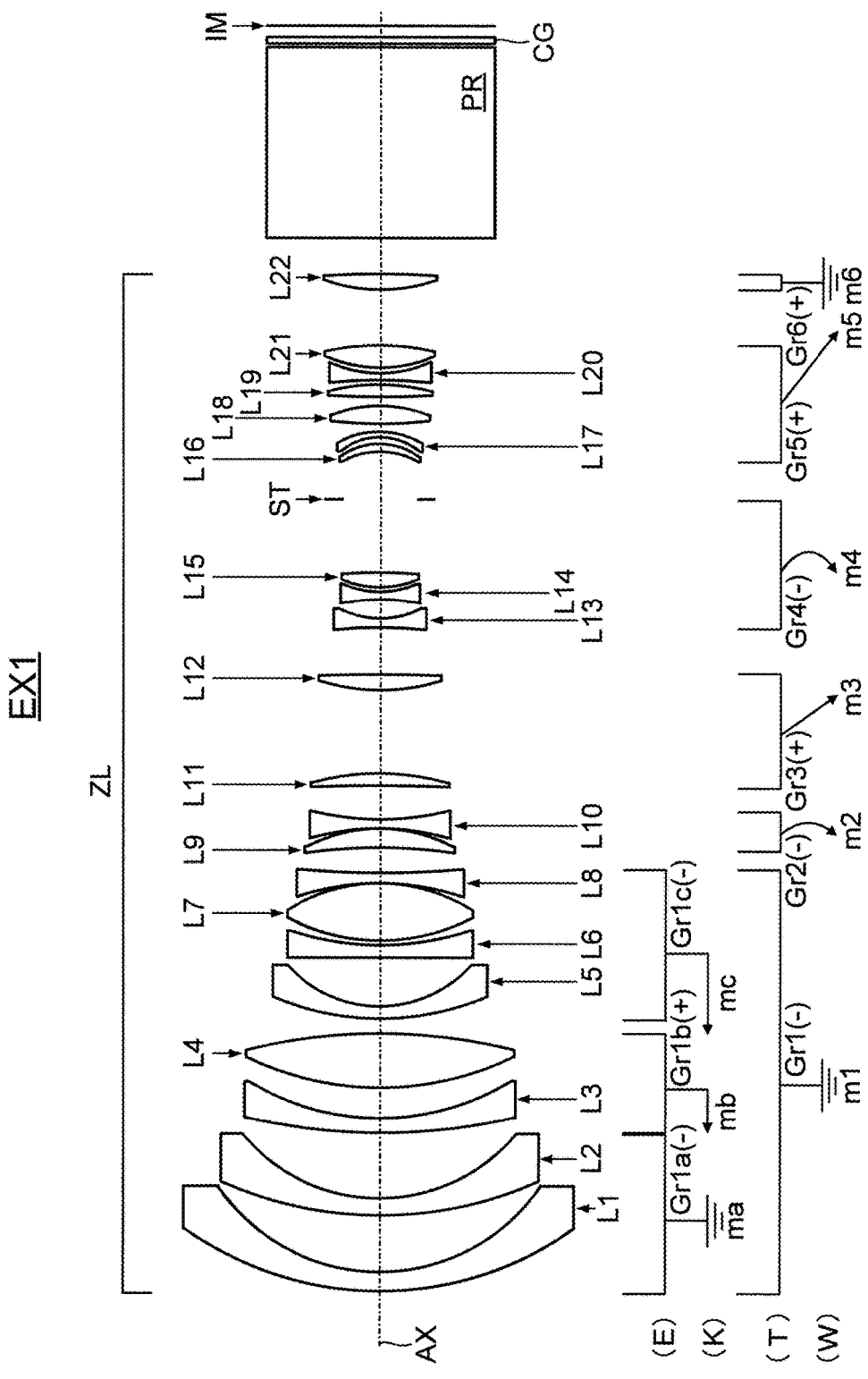
FIG. 1 is a lens construction diagram according to one or more embodiments of the invention (Example 1)
Figure 2:
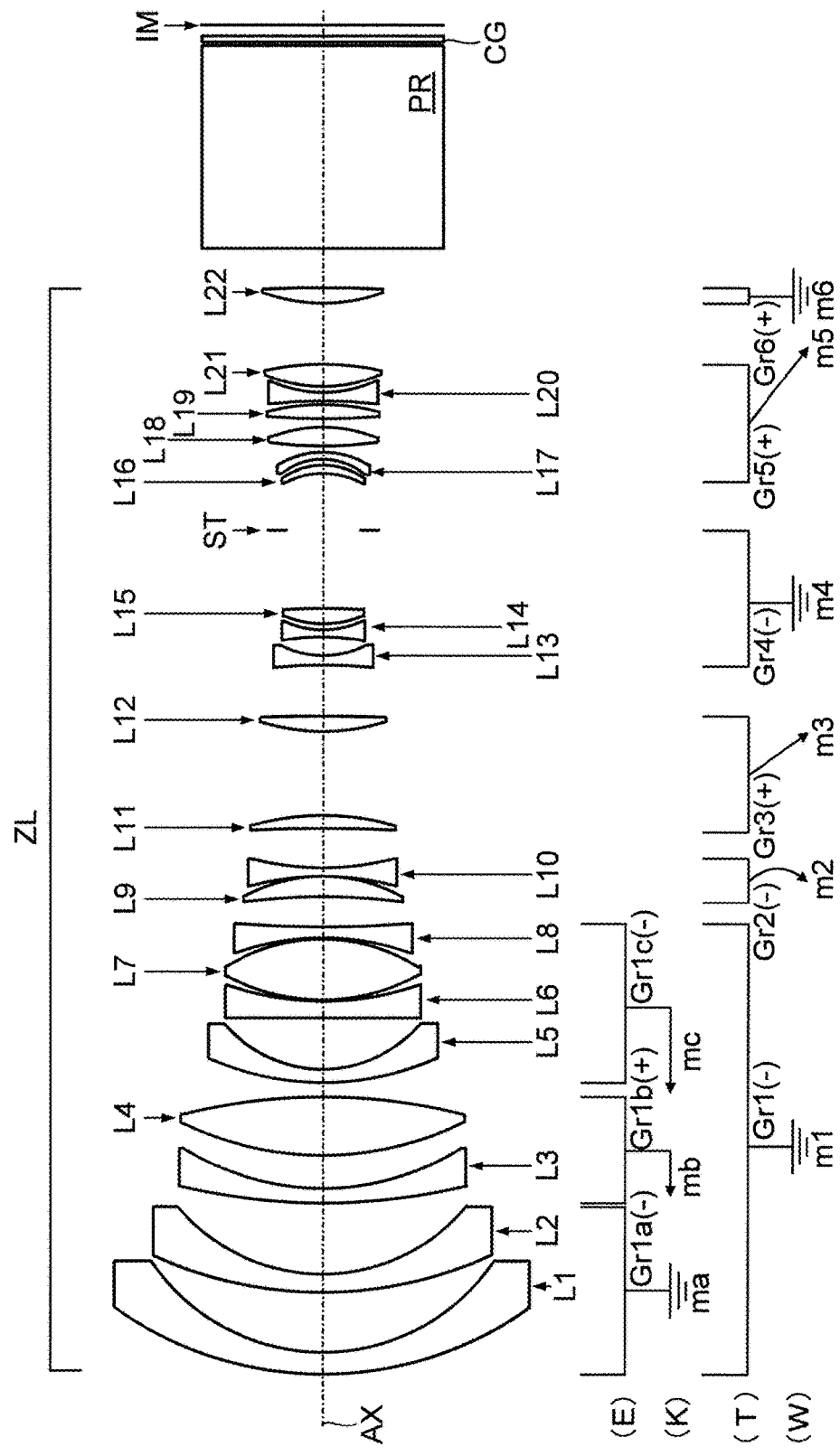
FIG. 2 is a lens construction diagram according to one or more embodiments of the invention (Example 2)
Figure 3:
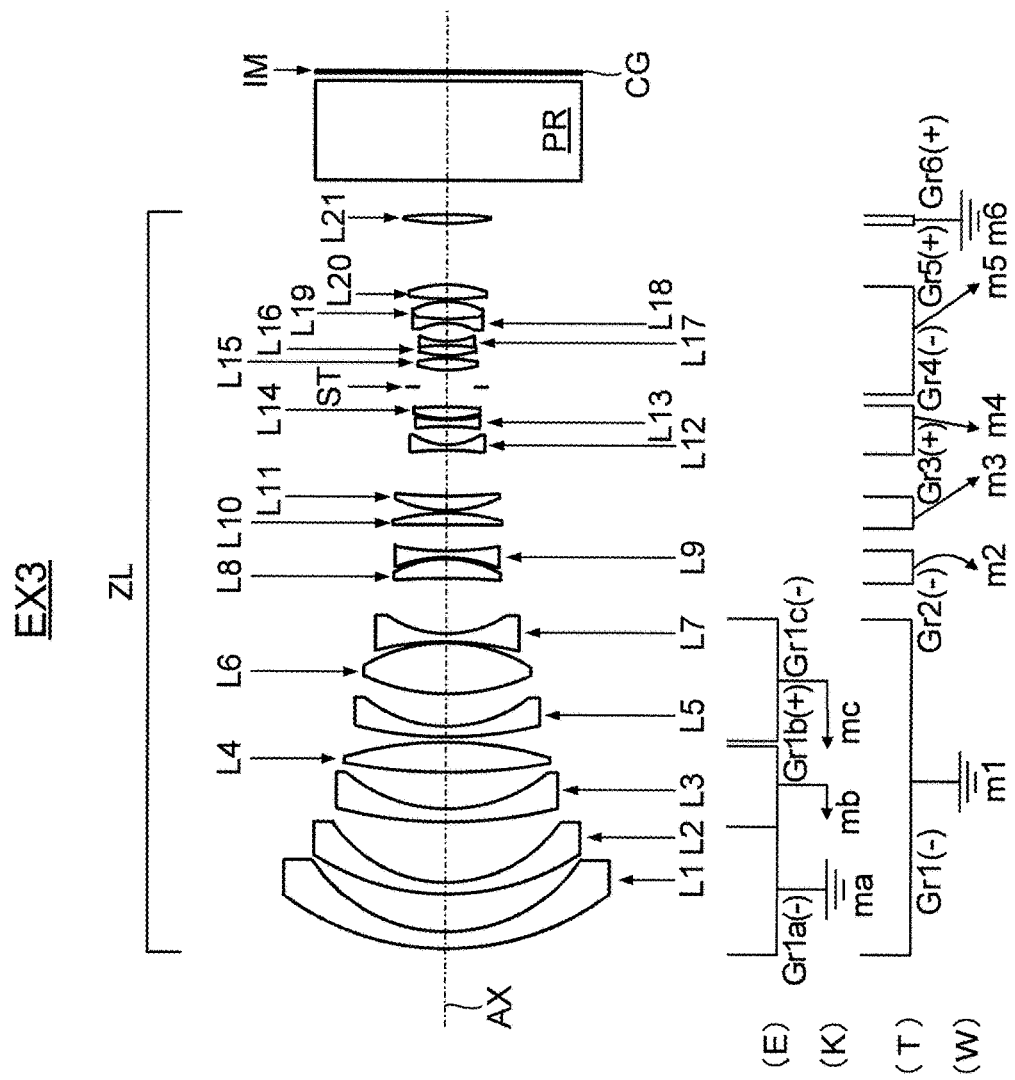
FIG. 3 is a lens construction diagram according to one or more embodiments of the invention (Example 3)

Hereinafter, projection lens systems, projectors, etc. according to one or more embodiments of the invention will be described. A projection lens system according to one or more embodiments of the invention is a projection lens system with a magnification-varying capability that is composed of, from the enlargement conjugate side, a first lens group having a negative refractive power and a plurality of lens groups and that performs zooming by varying the distances between the individual lens groups. One example of a variable-magnification optical system used in this projection lens system is a lens system with a variable focal length, such as a zoom lens systems or a varifocal lens system. To specify directions with respect to the variable-magnification optical system, the phrases "enlargement conjugate side" and "reduction conjugate side" will be used. The "enlargement conjugate side" refers to a direction in which an optical image is enlarged and is projected on a screen or the like, and the opposite direction is referred to as the reduction conjugate side, which is a direction in which an image display device (for example, a digital micromirror device) that displays an original optical image is arranged.

In the projection lens system above, the first lens group is characterized in that it is composed of three sub-groups, namely, a 1a-th lens group having a negative refractive power, a 1b-th lens group having a positive or negative refractive power, and a 1c-th lens group having a positive or negative refractive power; that, during zooming, the first lens group remains stationary on the optical axis; that, during focusing from the remote distance side to the close distance side, while the 1a-th lens group remains stationary on the optical axis, the 1b-th and 1c-th lens groups move toward the enlargement conjugate side along different loci respectively; and that conditional formula (1) below (i.e. a first conditional formula) is fulfilled at both the remote and close distance sides:

$$-4.7 < fl/fw < -2.5 \quad (1)$$

where fl represents the focal length of the first lens group; and fw represents the focal length of the entire system at the wide-angle end.

The projection lens system above adopts a negative group-led zooming optical construction, thereby to secure a wide angle of view and a long back focus, and in addition adopts, for focusing, a so-called floating focus system, in which a plurality of lens groups are moved along different loci to achieve focus, thereby to achieve focusing over a wide focus range while correcting variation of aberrations.

The 1a-th lens group, which is arranged at the most enlargement conjugate side, generally has the largest effective diameter; by arranging this 1a-th lens group such that it remains stationary on the optical axis during focusing, the following effects can be obtained. First, it is no longer necessary to move the heaviest lens group, and this helps reduce the burden on the focusing mechanism. Second, the lens total length no longer varies, and this helps prevent an excessively large size in the mechanism that holds the focusing group. Third, the position at which rays of light at the farthest angle of view from the optical axis pass no longer vary, and this helps suppress variation of lateral chromatic aberration during focusing.

Conditional formula (1) defines a range of the refractive power of the first lens group with respect to the refractive power of the entire system. Below the lower limit of conditional formula (I), the focal length of the first lens group is too short (that is, the negative refractive power is too weak); it is thus difficult to correct curvature of field that occurs in the over direction. On the other hand, above the upper limit of conditional formula (1), it is difficult to simultaneously correct both curvature of field and distortion. Thus, satisfying conditional formula (1) permits satisfactory correction of both curvature of field and distortion.

In the projection lens system above, in a variable-magnification optical system which is composed of a plurality of lens groups (movable and stationary groups) led by a negative group, the first lens group, which is arranged at the most enlargement conjugate side, is composed of three sub-groups, namely, in order from the enlargement conjugate side, a 1a-th lens group having a negative refractive power, a 1b-th lens group having a positive or negative refractive power, and a 1c-th lens group having a positive or negative refractive power. Moreover, as described above, a configuration is adopted in which the movement of the sub-groups during focusing, the focal length of the first lens group composed of the sub-groups, etc. are properly designed. It is thus possible to obtain a compact projection lens system with so high aberration performance as to be compatible with high-resolution image display devices over a wide focus range. Using such a projection lens system in projectors contributes to higher performance, higher functionality, more compactness, etc. in them. A description will be given below of conditions, etc. for obtaining those effects with a proper balance and for achieving still higher optical performance, still more compactness, etc.

Only either the 1b-th or 1c-th lens group have a positive refractive power and be composed of one positive lens element and one negative lens element. During focusing, by moving a sub-group having a positive refractive power and a sub-group having a negative refractive power in the same direction, it is possible to suppress variation of curvature of field. Moreover, a configuration with one positive lens element and one negative lens element provides an achromatic effect.

The 1b-th and 1c-th lens groups fulfill the conditional formula (2) (i.e. a second conditional formula) below.

$$0<|\Sigma(1/(fn \times vdn)) \times 1000|<2.7 \qquad (2)$$

where fn represents the focal length of a single lens element included in the 1b-th and 1c-th lens groups; and vdn represents the Abbe number of the single lens element included in the 1b-th and 1c-th lens groups.

Conditional formula (2) is a formula that defines a range of the achromatic condition within the first lens group, and is ideally equal to zero. Above the upper limit of conditional formula (2), variation of lateral and longitudinal chromatic aberrations during focusing is too large; this may make their correction difficult. Accordingly, by fulfilling conditional formula (2), it is possible to satisfactorily correct focusing-induced variation of lateral and longitudinal chromatic aberrations over a wide focus range.

The 1b-th and 1c-th lens groups fulfill the conditional formula (3) (i.e. a third conditional formula) below.

$$0<|\Sigma(1/(fn \times ndn)) \times 1000|<6.1 \qquad (3)$$

where fn represents the focal length of a single lens element included in the 1b-th and 1c-th lens groups; and ndn represents the refractive index of the single lens element included in the 1b-th and 1c-th lens groups.

Conditional formula (3) is a formula that defines a range of the Petzval sum within the first lens group, and is ideally equal to zero. Above the upper limit of conditional formula (3), variation of curvature of field ascribable to focusing is too large; this may make its correction difficult. Accordingly, by fulfilling conditional formula (3), it is possible to satisfactorily correct focusing-induced variation of curvature of field over a wide focus range.

The conditional formula (4) below (i.e. a fourth conditional formula) is fulfilled.

$$2.5<|(f1b/f1c) \times dx|<4.2 \qquad (4)$$

where f1b represents the focal length of the 1b-th lens group;

f1c represents the focal length of the 1c-th lens group; and dx represents the ratio of the amount of movement of the 1c-th lens group to the amount of movement of the 1b-th lens group for focusing.

As described above, by adopting a floating focus system in which, for focusing from the remote distance side to the close distance side, while the 1a-th lens group remains stationary on the optical axis, the 1b-th and 1c-th lens groups move toward the enlargement conjugate side along different loci respectively, it is possible to correct, by the focusing movement of the 1c-th lens group, variation of curvature of field resulting from the focusing movement of the 1b-th lens group. That is, the value corresponding to conditional formula (4) is a value that serves as an index of the effect of correction of the 1c-th lens group on curvature of field. Above the upper limit of conditional formula (4), excessive correction of curvature of field during focusing results. Below the lower limit of conditional formula (4), insufficient correction of curvature of field during focusing results. As a result, in either case, it may be difficult to obtain a wide focus range. Accordingly, by fulfilling conditional formula (4), it is possible to satisfactorily correct focusing-induced variation of curvature of field over a wide focus range. The conditional formula (4) is fulfilled at all zoom positions.

Next, by way of one or more embodiments, specific optical constructions of projection lens systems with a magnification-varying capability will be described. FIGS. 1 to 4 are lens construction diagrams corresponding to zoom lens systems ZL as projection lens systems according to one or more embodiments respectively, showing the lens arrangement, etc. at the telephoto end (T) in an optical section. In FIGS. 1 to 4, movement loci mk (k=1, 2, ..., 6) schematically show how the k-th lens groups Grk respectively move or remain stationary for zooming from the telephoto end (T) to the wide-angle end (W). In FIGS. 1 to 4, movement arrows ma, mb, and mc schematically show how the sub-groups Gr1a, Gr1b, and Gr1c respectively move or remain stationary for focusing from the focus position at which the projection distance is a remote distance (E) to the focus position at which the projection distance is a close distance (K).

The zoom lens systems ZL of one or more embodiments (in FIGS. 1 to 3) are zoom lens systems for projectors, each of which is composed of six groups, namely, in order from the enlargement conjugate side, a first lens group Gr1 having a negative refractive power, a second lens group Gr2 having a negative refractive power, a third lens group Gr3 having a positive refractive power, a fourth lens group Gr4 having a negative refractive power, a fifth lens group Gr5 having a positive refractive power, and a sixth lens group Gr6 having a positive refractive power. The zoom lens system ZL according to one or more embodiments (in FIG. 4) is a zoom lens system for a projector, which is composed of six groups, namely, in order from the enlargement conjugate side, a first lens group Gr1 having a negative refractive power, a second lens group Gr2 having a positive refractive power, a third lens group Gr3 having a positive refractive power, a fourth lens group Gr4 having a negative refractive power, a fifth lens group Gr5 having a positive refractive power, and a sixth lens group Gr6 having a positive refractive power. That is, one or more embodiments deal with zoom lens systems ZL of a six-group design with a negative-negative-positive-negative-positive-positive refractive power arrangement from the enlargement conjugate side, and other embodiment deals with a zoom lens system ZL of a six-group design with a negative-positive-positive-negative-positive-positive refractive power arrangement from the enlargement conjugate side.

In one or more embodiments, zooming is performed by moving the second lens group Gr2, the third lens group Gr3, the fourth lens group Gr4, and the fifth lens group Gr5 along the optical axis AX. In one or more embodiments, zooming is performed by moving the second lens group Gr2, the third lens group Gr3, and the fifth lens group Gr5 along the optical axis AX. In one or more embodiments, the first lens group Gr1 and the sixth lens group Gr6 are stationary groups; in one or more embodiments, the fourth lens group Gr4 is also a stationary group. Keeping the first lens group Gr1 stationary during zooming helps suppress variation of the optical system total length resulting from magnification variation, and helps reduce the number of movable components and thereby achieve a simple magnification varying mechanism. A prism PR (for example, a TIR (total internal reflection) prism, a color splitting/integrating prism, or the like) arranged at the reduction conjugate side of the sixth lens group Gr6 and a cover glass CG of an image display device also remain stationary during zooming.

In one or more embodiments, the 1a-th lens group Gr1a having a negative refractive power remains stationary on the optical axis AX, and the 1b-th lens group Gr1b having a positive refractive power and the 1c-th lens group Gr1c having a negative refractive power move toward the enlargement conjugate side along different loci respectively. In one or more embodiments, the 1a-th lens group Gr1a having a negative refractive power remains stationary on the optical axis AX, and the 1b-th lens group Gr1b having a negative refractive power and the 1c-th lens group Gr1c having a positive refractive power move toward the enlargement conjugate side along different loci respectively. In the one or more embodiments, the 1b-th lens group Gr1b having a positive refractive power is composed of one positive lens element and one negative lens element. In one or more embodiments, the 1c-th lens group Gr1c having a positive refractive power is composed of one positive lens element and one negative lens element. By moving, during focusing, a sub-group having a positive refractive power and a sub-group having a negative refractive power in the same direction, it is possible to suppress variation of curvature of field. Moreover, composing a positive sub-group that moves during focusing of one positive lens element and one negative lens element permits it to provide an achromatic effect.

Figure 29:
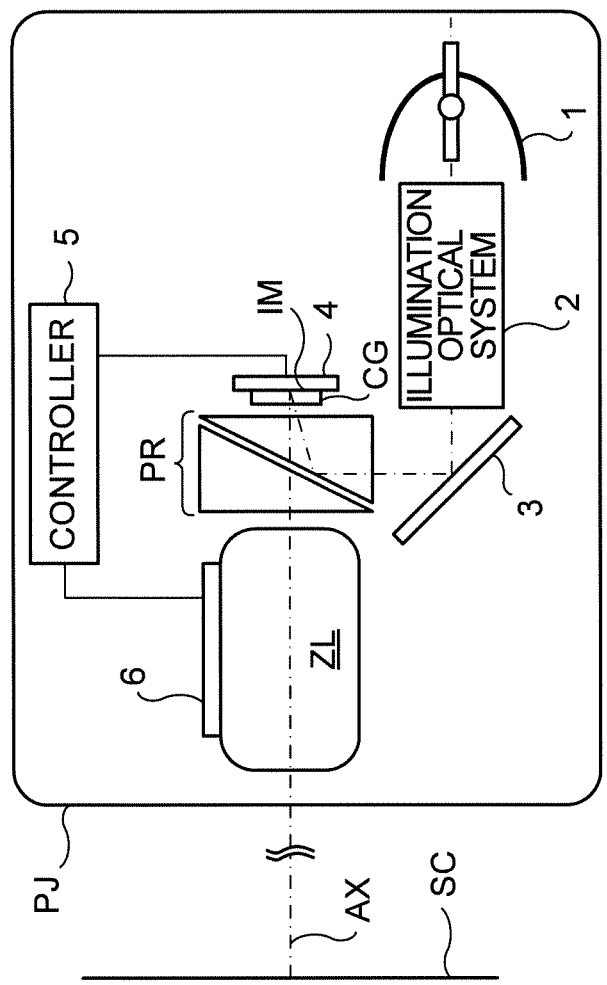
FIG. 29 is a schematic diagram showing a projector according to one or more embodiments of the invention.

Next, a description will be given of a projector according to one or more embodiments to which a zoom lens system ZL as described above is applied as a projection lens system. FIG. 29 shows an outline of the configuration of the projector PJ. The projector PJ includes a light source 1, an illumination optical system 2, a reflection mirror 3, a prism PR, an image display device (image forming device) 4, a controller 5, an actuator 6, a zoom lens system (projection lens system) ZL, etc. The controller 5 is a part that controls the entire projector PJ. The image display device 4 is an image modulation device (for example, a digital micromirror device) that modulates light to produce an image, and is provided with a cover glass CG on a display surface IM on which the image is displayed.

The light emitted from the light source 1 (for example, a white light source such as a xenon lamp, or a laser light source) is directed via the illumination optical system 2, the reflection mirror 3, and the prism PR to the image display device 4, where image light is formed. The prism PR is, for example, a TIR prism (or a color splitting/integrating prism or the like), and among others separates illumination light and projection light. The image light formed on the image display device 4 is projected through the zoom lens system ZL toward a screen surface SC on a magnified scale. That is, the image displayed on the image display device 4 is projected through the zoom lens system ZL onto the screen surface SC on a magnified scale.

The projector PJ, as described above, includes the image display device 4 that displays an image, the light source 1, the illumination optical system 2 that directs light from the light source 1 to the image display device 4, and the zoom lens system ZL that projects the image displayed on the image display device 4 onto the screen surface SC on a magnified scale. This, however, is not meant to limit projectors to which the zoom lens system ZL as the projection lens system is applicable. For example, using an image display device that displays an image by light emission by the image display surface itself can eliminate the need for illumination. In that case, a projector can be designed without a light source 1 or an illumination optical system 2.

In the zoom lens system ZL, lens groups that move for zooming or focusing have an actuator 6 connected to them which moves them along the optical axis AX toward the enlargement conjugate side or toward the reduction conjugate side. To the actuator 6, the controller 5 is connected for controlling the movement of the movable groups. The lens groups may instead be moved manually without the use of the controller 5 or the actuator 6.

Hereinafter, the construction, etc. of the projection lens systems embodying one or more embodiments of the invention will be described more specifically with reference to the construction data, etc. of examples. Examples 1 to 4 (EX1 to EX4) discussed below are numerical examples of one or more embodiments, and the lens construction diagrams (FIGS. 1 to 4) show the lens sectional shapes, lens arrangement, etc. in the corresponding ones of Examples 1 to 4 respectively.

In the construction data of each example, listed as surface data are, in order starting with the leftmost column, surface number i, paraxial radius of curvature CR (mm), axial surface-to-surface distance Ti (mm), refractive index nd for the d-line (with a wavelength of 587.56 nm), and Abbe number vd for the d-line. ST represents an aperture stop, IM represents an image display surface, and F and Z represent variable surface-to-surface distances Ti (i: surface number) during focusing and zooming respectively.

Listed as miscellaneous data 1 and 2 are, for each of a close-distance focus position K and a remote-distance focus position E, projection distance (mm), focal length of the entire system (mm), zoom ratio, half-angle of view (ω, °), f-number, and variable surface-to-surface distances Ti (i: surface number, mm) which is group-to-group distances. Listed as miscellaneous data 3 are back focus (BF, mm), lens total length (mm), and maximum image height (mm). The projection distance is the distance from the screen surface SC to the vertex of the foremost surface (i=1) of the zoom lens system ZL. The back focus BF is the air-equivalent distance from the last surface of the lens system to the image display surface IM. The lens total length TL is the sum of the distance from the foremost surface (i=1) to the last surface of the zoom lens system ZL and the back focus BF. The maximum image height corresponds to half the diagonal length of the image display surface IM. As for the data that vary with zooming, values at the zoom positions T, M, and W respectively are given.

Listed as miscellaneous data 4 are the movement amounts (mm) of the focus groups Gr1b and Gr1c, and the ratio dx of their movement amounts. Listed as miscellaneous data 5 are the focal lengths fk of the k-th lens groups Grk (k=1, 2, . . . , 6), and the focal lengths f1a, f1b, and f1c of the 1a-th lens group Gr1a, the 1b-th lens group Gr1b, and the 1c-th lens group Gr1c. As for the first lens group Gr1, its focal length f1 and refractive power φ1 are listed for each of the focus positions K and E.

Tables 1 to 4 list the focal lengths fl of the j-th lens systems Lj (j=1, 2, 3, . . . ), 1/(fn×vdn) as data related to conditional formula (2), 1/(fn×ndn) as data related to conditional formula (3) in each example. Table 5 shows the values corresponding to conditional formulae (1) to (4) in each example.

FIGS. 5A to 10D, 11A to 16D, 17A to 22D, and 23A to 28D are aberration diagrams corresponding to Examples 1, 2, 3, and 4 (EX1, EX2, EX3, and EX4) respectively. FIGS.

5A to 7D, 11A to 13D, 17A to 19D, and 23A to 25D show the aberrations observed at the close-distance focus position (K), and FIGS. 8A to 10D, 14A to 16D, 20A to 22D, and 26A to 28D show the aberrations observed at the remote-distance focus position (E).

FIGS. 5A to 5D, 8A to 8D, 11A to 11D, 14A to 14D, 17A to 17D, 20A to 20D, 23A to 23D, and 26A to 26D show the aberrations observed at the telephoto end (T). FIGS. 6A to 6D, 9A to 9D, 12A to 12D, 15A to 15D, 18A to 18D, 21A to 21D, 24A to 24D, and 27A to 27D show the aberrations observed at the middle position (M, the middle focal length condition). FIGS. 7A to 7D, 10A to 10D, 13A to 13D, 16A to 16D, 19A to 19D, 22A to 22D, 25A to 25D, and 28A to 28D show the aberrations observed at the wide-angle end (W). Of FIGS. 5A to 28D, those with the suffix A show spherical aberration (mm), those with the suffix B show astigmatism (mm), those with the suffix C show distortion (%), and those with the suffix D show lateral chromatic aberration (mm).

In the spherical aberration diagrams with the suffix A, the vertical axis represents the value obtained by normalizing the height of rays of light incident on the pupil with respect to the maximum height there (that is, the relative pupil height), and the horizontal axis represents the amounts of spherical aberration for rays of light with wavelengths of 460 nm, 546 nm, and 620 nm, given as the deviation (on a scale from −0.1 mm to 0.1 mm along the horizontal axis) from the paraxial image surface in the optical axis AX direction. The correspondence between different wavelengths and different types of lines in the spherical aberration diagrams is as follows:

Spherical aberration at a wavelength of 460 nm: a long-dashed line;

spherical aberration at a wavelength of 546 nm: a solid line; and spherical aberration at a wavelength of 620 nm: a short-dashed line.

In the astigmatism diagrams with the suffix B, the vertical axis represents the paraxial image height (mm), and the horizontal axis represents the sagittal (S) image surface and meridional (M) image surface for rays of light with wavelengths of 460 nm, 546 nm, and 620 nm, given as the deviation (on a scale of −0.1 mm to 0.1 mm along the horizontal axis) from the paraxial image surface in the optical axis AX direction. The correspondence between different wavelengths and different types of lines in the astigmatism diagrams is as follows:

S image surface at a wavelength of 460 nm: a dash-dot line;

M image surface at a wavelength of 460 nm: a dotted line;

S image surface at a wavelength of 546 nm: a long-dashed line;

M image surface at a wavelength of 546 nm: a solid line;

S image surface at a wavelength of 620 nm: a dash-dot-dot line; and

M image surface at a wavelength of 620 nm: a short-dashed line.

In the distortion diagrams with the suffix C, the vertical axis represents the paraxial image height (mm), and the horizontal axis represents the distortion (on a scale of −1.5% to 1.5% along the horizontal axis) for rays of light with a wavelength of 546 nm.

In the lateral chromatic aberration diagrams with the suffix D, the vertical axis represents the paraxial image height (mm); the horizontal axis represents the lateral chromatic aberration (blue-green) corresponding to the difference between the rays of light with a wavelength of 460 nm and the rays of light with a wavelength of 546 nm, and represents the lateral chromatic aberration (red-green) corresponding to the difference between the rays of light with a wavelength of 620 nm and the rays of light with a wavelength of 546 nm (on a scale of −0.005 mm to 0.005 mm along the horizontal axis). The correspondence between different wavelengths and different types of lines in the lateral chromatic aberration diagrams is as follows:

The lateral chromatic aberration (blue-green): a solid line; and the lateral chromatic aberration (red-green): a dashed line.

Example 1 has a six-group design of a negative-negative-positive-negative-positive-positive type composed of a total of 22 lens elements (a 1st to a 22nd lens element L1 to L22), the first lens group Gr1 including eight, i.e., a negative, a negative, a negative, a positive, a negative, a negative, a positive, and a negative, lens elements, the second lens group Gr2 including two, i.e., a positive and a negative, lens elements, the third lens group Gr3 including two, i.e., a positive and a positive, lens elements, the fourth lens group Gr4 including three, i.e., a negative, a negative, and a positive, lens elements, the fifth lens group Gr5 including six, i.e., a positive, a negative, a positive, a positive, a negative, and a positive, lens elements, and the sixth lens group Gr6 including one positive lens element. The 1st to 45th surfaces constitute a lens unit of the zoom lens system ZL, and the 46th and the following surfaces belong to the prism PR and the cover glass CG of the image display device 4. The 31st surface corresponds to an aperture stop, is arranged at the most reduction conjugate side in the fourth lens group Gr4, and moves together with the fourth lens group Gr4 as a part of it during magnification variation (the movement locus m4 in FIG. 1).

In Example 1, for magnification variation from the telephoto end (T) to the wide-angle end (W), the first lens group Gr1 remains stationary on the optical axis AX; the second lens group Gr2 moves along a curved locus convex to the reduction conjugate side (with the movement during magnification variation expanded) (that is, it first moves toward the reduction conjugate side, and then makes a U-turn to move back toward the enlargement conjugate side); the third lens group Gr3 moves toward the reduction conjugate side; the fourth lens group Gr4 moves along a curved locus convex to the reduction conjugate side (with the movement during magnification variation expanded) (that is, it first moves toward the reduction conjugate side, and then makes a U-turn to move back toward the enlargement conjugate side); the fifth lens group Gr5 moves toward the reduction conjugate side; and the sixth lens group Gr6 remains stationary on the optical axis AX.

In Example 1, the first lens group Gr1 is divided, in order from the enlargement conjugate side, into a 1a-th lens group Gr1$a$ having a negative refractive power which is composed of two, i.e., a negative and a negative, lens elements, a 1b-th lens group Gr1$b$ having a positive refractive power which is composed of two, i.e., a negative and a positive, lens elements, and a 1c-th lens group Gr1$c$ having a negative refractive power which is composed of four, i.e., a negative, a negative, a positive, and a negative, lens elements. For focusing from the remote distance side (E) to the close distance side (K), the 1a-th lens group Gr1$a$ remains stationary on the optical axis AX, and the 1b-th lens group Gr1$b$ and the 1c-th lens group Gr1$c$ move toward the enlargement conjugate side along different loci respectively. For focusing from the remote distance side (E) to the close distance side (K), the ratio of the movement amounts between the 1b-th lens group Gr1$b$ and the 1c-th lens group Gr1$c$ is 1.867.

Example 2 has a six-group design of a negative-negative-positive-negative-positive-positive type composed of a total of 22 lens elements (a 1st to a 22nd lens element L1 to L22), the first lens group Gr1 including eight, i.e., a negative, a negative, a negative, a positive, a negative, a positive, and a negative, lens elements, the second lens group Gr2 including two, i.e., a positive and a negative, lens elements, the third lens group Gr3 including two, i.e., a positive and a positive, lens elements, the fourth lens group Gr4 including three, i.e., a negative, a negative, and a positive, lens elements, the fifth lens group Gr5 including six, i.e., a positive, a negative, a positive, a positive, a negative, and a positive, lens elements, and the sixth lens group Gr6 including one positive lens element. The 1st to 45th surfaces constitute a lens unit of the zoom lens system ZL, and the 46th and the following surfaces belong to the prism PR and the cover glass CG of the image display device 4. The 31st surface corresponds to an aperture stop, is arranged at the most reduction conjugate side in the fourth lens group Gr4, and remains stationary as a part of the fourth lens group Gr4 during magnification variation (the movement locus m4 in FIG. 2).

In Example 2, for magnification variation from the telephoto end (T) to the wide-angle end (W), the first lens group Gr1 remains stationary on the optical axis AX; the second lens group Gr2 moves along a curved locus convex to the reduction conjugate side (with the movement during magnification variation expanded) (that is, it first moves toward the reduction conjugate side, and then makes a U-turn to move back toward the enlargement conjugate side); the third lens group Gr3 moves toward the reduction conjugate side; the fourth lens group Gr4 remains stationary on the optical axis AX; the fifth lens group Gr5 moves toward the reduction conjugate side; and the sixth lens group Gr6 remains stationary on the optical axis AX.

In Example 2, the first lens group Gr1 is divided, in order from the enlargement conjugate side, into a 1a-th lens group Gr1a having a negative refractive power which is composed of two, i.e., a negative and a negative, lens elements, a 1b-th lens group Gr1b having a positive refractive power which is composed of two, i.e., a negative and a positive, lens elements, and a 1c-th lens group Gr1c having a negative refractive power which is composed of four, i.e., a negative, a negative, a positive, and a negative, lens elements. For focusing from the remote distance side (E) to the close distance side (K), the 1a-th lens group Gr1a remains stationary on the optical axis AX, and the 1b-th lens group Gr1b and the 1c-th lens group Gr1c move toward the enlargement conjugate side along different loci respectively. For focusing from the remote distance side (E) to the close distance side (K), the ratio of the movement amounts between the 1b-th lens group Gr1b and the 1c-th lens group Gr1c is 1.875.

Example 3 has a six-group design of a negative-negative-positive-negative-positive-positive type composed of a total of 21 lens elements (a 1st to a 21st lens element L1 to L21), the first lens group Gr1 including eight, i.e., a negative, a negative, a negative, a positive, a negative, a positive, and a negative, lens elements, the second lens group Gr2 including two, i.e., a positive and a negative, lens elements, the third lens group Gr3 including two, i.e., a positive and a positive, lens elements, the fourth lens group Gr4 including three, i.e., a negative, a negative, and a positive, lens elements, the fifth lens group Gr5 including six, i.e., a positive, a positive, a negative, a negative, a positive, and a positive, lens elements, and the sixth lens group Gr6 including one positive lens element. The 1st to 43rd surfaces constitute a lens unit of the zoom lens system ZL, and the 44th and the following surfaces belong to the prism PR and the cover glass CG of the image display device 4. The 29th surface corresponds to an aperture stop, is arranged at the most enlargement conjugate side in the fifth lens group Gr5, and moves together with the fifth lens group Gr5 as a part of it during magnification variation (the movement locus m5 in FIG. 3).

In Example 3, for magnification variation from the telephoto end (T) to the wide-angle end (W), the first lens group Gr1 remains stationary on the optical axis AX; the second lens group Gr2 moves along a curved locus convex to the reduction conjugate side (with the movement during magnification variation expanded) (that is, it first moves toward the reduction conjugate side, and then makes a U-turn to move back toward the enlargement conjugate side); the third lens group Gr3 moves toward the reduction conjugate side; the fourth lens group Gr4 moves toward the enlargement conjugate side; the fifth lens group Gr5 moves toward the reduction conjugate side; and the sixth lens group Gr6 remains stationary on the optical axis AX.

In Example 3, the first lens group Gr1 is divided, in order from the enlargement conjugate side, into a 1a-th lens group Gr1a having a negative refractive power which is composed of two, i.e., a negative and a negative, lens elements, a 1b-th lens group Gr1b having a positive refractive power which is composed of two, i.e., a negative and a positive, lens elements, and a 1c-th lens group Gr1c having a negative refractive power which is composed of three, i.e., a negative, a positive, and a negative, lens elements. For focusing from the remote distance side (E) to the close distance side (K), the 1a-th lens group Gr1a remains stationary on the optical axis AX, and the 1b-th lens group Gr1b and the 1c-th lens group Gr1c move toward the enlargement conjugate side along different loci respectively. For focusing from the remote distance side (E) to the close distance side (K), the ratio of the movement amounts between the 1b-th lens group Gr1b and the 1c-th lens group Gr1c is 1.828.

Example 4 has a six-group design of a negative-positive-positive-negative-positive-positive type composed of a total of 19 lens elements (a 1st to a 19th lens element L1 to L19), the first lens group Gr1 including six, i.e., a positive, a negative, a negative, a negative, a negative, and a positive, lens elements, the second lens group Gr2 including two, i.e., a negative and a positive, lens elements, the third lens group Gr3 including one positive lens element, the fourth lens group Gr4 including three, i.e., a negative, a negative, and a positive, lens elements, the fifth lens group Gr5 including six, i.e., a positive, a negative, a positive, a positive, a negative, and a positive, lens elements, and the sixth lens group Gr6 including one positive lens element. The 1st to 39th surfaces constitute a lens unit of the zoom lens system ZL, and the 40th and the following surfaces belong to the prism PR and the cover glass CG of the image display device 4. The 25th surface corresponds to an aperture stop, is arranged at the most reduction conjugate side in the fourth lens group Gr4, and moves together with the fourth lens group Gr4 as a part of it during magnification variation (the movement locus m4 in FIG. 4).

In Example 4, for magnification variation from the telephoto end (T) to the wide-angle end (W), the first lens group Gr1 remains stationary on the optical axis AX; the second lens group Gr2 moves toward the reduction conjugate side; the third lens group Gr3 moves toward the reduction conjugate side; the fourth lens group Gr4 moves toward the reduction conjugate side; the fifth lens group Gr5 moves toward the reduction conjugate side; and the sixth lens group Gr6 remains stationary on the optical axis AX.

In Example 4, the first lens group Gr1 is divided, in order from the enlargement conjugate side, into a 1a-th lens group Gr1a having a negative refractive power which is composed of two, i.e., a positive and a negative, lens elements, a 1b-th lens group Gr1b having a negative refractive power which is composed of two, i.e., a negative and a negative, lens elements, and a 1c-th lens group Gr1c having a positive refractive power which is composed of two, i.e., a negative and a positive, lens elements. For focusing from the remote distance side (E) to the close distance side (K), the 1a-th lens group Gr1a remains stationary on the optical axis AX, and the 1b-th lens group Gr1b and the 1c-th lens group Gr1c move toward the enlargement conjugate side along different loci respectively. For focusing from the remote distance side (E) to the close distance side (K), the ratio of the movement amounts between the 1b-th lens group Gr1b and the 1c-th lens group Gr1c is 3.749.

When the zoom lens systems ZL are used as projection lens systems in projectors (for example, liquid crystal projectors) PJ, intrinsically, the screen surface (projected surface) SC is the image plane and the image display surface (for example, the liquid crystal panel surface) IM is the object plane; however, the zoom lens systems ZL are dealt with as a reduction system based in terms of optical design, and the screen surface SC (FIG. 29) is taken as the object plane for the purpose of evaluating the optical performance at the image display surface (the image plane at the reduction conjugate side) IM. As will been understood from the obtained optical performance, the zoom lens systems ZL can be suitably used not only as projection lens systems for projectors but also as imaging lens systems for imaging devices (for example, video cameras and digital cameras).

EXAMPLE 1

| | Unit: mm | | | |
|---|---|---|---|---|
| | Surface Data | | | |
| i | CR | Ti | nd | vd |
| 1 | 149.381 | 8.860 | 1.70154 | 41.15 |
| 2 | 86.666 | 24.882 | | |
| 3 | 173.342 | 7.182 | 1.72342 | 37.99 |
| 4 | 78.713 | Variable (F) | | |
| 5 | 264.092 | 6.242 | 1.60311 | 60.69 |
| 6 | 111.890 | 13.319 | | |
| 7 | 135.418 | 24.079 | 1.80610 | 33.27 |
| 8 | −243.481 | Variable (F) | | |
| 9 | 120.779 | 5.916 | 1.83400 | 37.34 |
| 10 | 55.236 | 20.995 | | |
| 11 | ∞ | 5.459 | 1.61800 | 63.39 |
| 12 | 126.905 | 4.549 | | |
| 13 | 87.400 | 25.474 | 1.48749 | 70.44 |
| 14 | −76.522 | 0.200 | | |
| 15 | −113.854 | 3.996 | 1.71300 | 53.94 |
| 16 | 398.513 | Variable (F, Z) | | |
| 17 | −234.986 | 8.138 | 1.51680 | 64.20 |
| 18 | −69.628 | 0.236 | | |
| 19 | −112.286 | 3.276 | 1.80809 | 22.76 |
| 20 | 127.831 | Variable (Z) | | |
| 21 | −765.083 | 6.211 | 1.80610 | 33.27 |
| 22 | −107.249 | 35.992 | | |
| 23 | 89.197 | 7.144 | 1.90366 | 31.31 |
| 24 | −684.045 | Variable (Z) | | |
| 25 | −203.532 | 3.601 | 1.43700 | 95.10 |
| 26 | 40.134 | 8.955 | | |
| 27 | −97.142 | 2.915 | 1.43700 | 95.10 |
| 28 | 41.652 | 2.276 | | |
| 29 | 44.055 | 6.911 | 1.56883 | 56.04 |
| 30 | −254.480 | 31.338 | | |

-continued

| | Unit: mm | | | |
|---|---|---|---|---|
| 31 | ∞(ST) | Variable (Z) | | |
| 32 | −35.449 | 3.609 | 1.43700 | 95.10 |
| 33 | −29.388 | 2.623 | | |
| 34 | −28.198 | 2.500 | 1.88300 | 40.80 |
| 35 | −37.791 | 3.554 | | |
| 36 | 192.372 | 8.435 | 1.43700 | 95.10 |
| 37 | −59.312 | 3.000 | | |
| 38 | 363.100 | 5.838 | 1.43700 | 95.10 |
| 39 | −92.305 | 1.952 | | |
| 40 | −221.625 | 2.568 | 1.80610 | 40.73 |
| 41 | 54.771 | 2.237 | | |
| 42 | 60.996 | 10.451 | 1.43700 | 95.10 |
| 43 | −109.156 | Variable (Z) | | |
| 44 | 75.894 | 7.744 | 1.53775 | 74.70 |
| 45 | −397.771 | 15.300 | | |
| 46 | ∞ | 85.000 | 1.51680 | 64.20 |
| 47 | ∞ | 1.000 | | |
| 48 | ∞ | 3.000 | 1.48749 | 70.44 |
| 49 | ∞ | 4.000 | | |
| 50 (IM) | | | | |

| | (T) | (M) | (W) |
|---|---|---|---|
| Miscellaneous Data 1 | | | |
| Projection Distance 1751(K) | | | |
| Focal Length | 25.543 | 21.200 | 17.623 |
| Zoom Ratio | 1.449 | | |
| Half-Angle of View ω | 31.577 | 36.522 | 41.698 |
| F-Number | 2.499 | 2.378 | 2.299 |
| Group Distance | | | |
| T4 | 27.310 | 27.296 | 27.284 |
| T8 | 4.022 | 4.010 | 4.000 |
| T16 | 21.314 | 24.448 | 20.607 |
| T20 | 11.622 | 19.627 | 31.761 |
| T24 | 21.107 | 12.044 | 3.009 |
| T31 | 21.517 | 32.042 | 44.239 |
| T43 | 24.508 | 11.934 | 0.500 |
| Miscellaneous Data 2 | | | |
| Projection Distance 10914(E) | | | |
| Focal Length | 25.764 | 21.398 | 17.800 |
| Zoom Ratio | 1.447 | | |
| Half-Angle of View ω | 31.357 | 36.268 | 41.414 |
| F-Number | 2.500 | 2.381 | 2.300 |
| Group Distance | | | |
| T4 | 29.329 | 29.327 | 29.325 |
| T8 | 5.773 | 5.771 | 5.769 |
| T16 | 17.543 | 20.656 | 16.798 |
| T20 | 11.622 | 19.627 | 31.761 |
| T24 | 21.107 | 12.044 | 3.009 |
| T31 | 21.517 | 32.042 | 44.239 |
| T43 | 24.508 | 11.934 | 0.500 |

| Miscellaneous Data 3 | |
|---|---|
| BF | 78.356 |
| Lens Total Length | 449.724 |
| Maximum Image Height | 15.700 |

| Miscellaneous Data 4 | | | |
|---|---|---|---|
| Focus Group Movement Amount | | | |
| | (T) | (M) | (W) |
| Gr1b | | | |
| 10914(E) | 0.000 | 0.000 | 0.000 |
| 1751(K) | −2.020 | −2.031 | −2.041 |
| Gr1c | | | |
| 10914(E) | 0.000 | 0.000 | 0.000 |
| 1751(K) | −3.771 | −3.792 | −3.810 |
| Movement Amount Ratio | 1.867 | | |

-continued

Unit: mm

Miscellaneous Data 5
Focal Lengths of Lens Groups

| | |
|---|---|
| f1a | −117.641 |
| f1b | 155.784 |
| f1c | −109.152 |
| f2 | −117.717 |
| f3 | 65.229 |
| f4 | −86.554 |
| f5 | 190.934 |
| f6 | 118.822 |

| | (K) | (E) |
|---|---|---|
| f1 | −80.085 | −80.034 |
| φ1 | −0.012 | −0.012 |

EXAMPLE 2

Unit: mm

Surface Data

| i | CR | Ti | nd | νd |
|---|---|---|---|---|
| 1 | 150.095 | 8.858 | 1.70154 | 41.15 |
| 2 | 86.592 | 24.597 | | |
| 3 | 170.672 | 7.175 | 1.72342 | 37.99 |
| 4 | 78.565 | Variable (F) | | |
| 5 | 254.885 | 6.244 | 1.60311 | 60.69 |
| 6 | 107.970 | 13.764 | | |
| 7 | 133.887 | 24.456 | 1.80610 | 33.27 |
| 8 | −239.234 | Variable (F) | | |
| 9 | 118.053 | 5.181 | 1.83400 | 37.34 |
| 10 | 54.726 | 21.439 | | |
| 11 | ∞ | 6.402 | 1.61800 | 63.39 |
| 12 | 122.819 | 2.869 | | |
| 13 | 84.910 | 26.114 | 1.48749 | 70.44 |
| 14 | −75.407 | 0.200 | | |
| 15 | −110.138 | 4.164 | 1.71300 | 53.94 |
| 16 | 467.940 | Variable (F, Z) | | |
| 17 | −244.399 | 8.343 | 1.51680 | 64.20 |
| 18 | −69.011 | 0.200 | | |
| 19 | −116.257 | 3.257 | 1.80809 | 22.76 |
| 20 | 120.131 | Variable (Z) | | |
| 21 | −628.811 | 5.880 | 1.80610 | 33.27 |
| 22 | −107.308 | 33.667 | | |
| 23 | 88.522 | 7.035 | 1.90366 | 31.31 |
| 24 | −742.722 | Variable (Z) | | |
| 25 | −214.299 | 3.620 | 1.43700 | 95.10 |
| 26 | 40.712 | 8.888 | | |
| 27 | −94.432 | 1.950 | 1.43700 | 95.10 |
| 28 | 40.797 | 2.411 | | |
| 29 | 43.704 | 7.061 | 1.56883 | 56.04 |
| 30 | −261.358 | 31.516 | | |
| 31 | ∞(ST) | Variable (Z) | | |
| 32 | −34.781 | 2.938 | 1.43700 | 95.10 |
| 33 | −29.425 | 2.887 | | |
| 34 | −28.235 | 2.500 | 1.88300 | 40.80 |
| 35 | −37.056 | 2.275 | | |
| 36 | 171.703 | 8.504 | 1.43700 | 95.10 |
| 37 | −60.697 | 3.022 | | |
| 38 | 320.474 | 6.278 | 1.43700 | 95.10 |
| 39 | −89.428 | 1.907 | | |
| 40 | −208.292 | 2.579 | 1.80610 | 40.73 |
| 41 | 54.634 | 2.328 | | |
| 42 | 61.663 | 10.341 | 1.43700 | 95.10 |
| 43 | −111.100 | Variable (Z) | | |
| 44 | 74.064 | 7.182 | 1.53775 | 74.70 |
| 45 | −517.781 | 15.717 | | |
| 46 | ∞ | 85.000 | 1.51680 | 64.20 |
| 47 | ∞ | 1.000 | | |
| 48 | ∞ | 3.000 | 1.48749 | 70.44 |
| 49 | ∞ | 4.000 | | |
| 50 (IM) | | | | |

| | (T) | (M) | (W) |
|---|---|---|---|

Miscellaneous Data 1
Projection Distance 1726(K)

| | (T) | (M) | (W) |
|---|---|---|---|
| Focal Length | 25.546 | 21.193 | 17.604 |
| Zoom Ratio | 1.451 | | |
| Half-Angle of View ω | 31.574 | 36.532 | 41.729 |
| F-Number | 2.659 | 2.516 | 2.399 |
| Group Distance | | | |
| T4 | 27.158 | 27.145 | 27.134 |
| T8 | 4.021 | 4.009 | 4.000 |
| T16 | 24.108 | 25.172 | 22.059 |
| T20 | 12.881 | 21.309 | 33.097 |
| T24 | 20.975 | 11.507 | 2.853 |
| T31 | 24.673 | 36.229 | 48.258 |
| T43 | 24.085 | 12.529 | 0.500 |

Miscellaneous Data 2
Projection Distance 10988(E)

| | (T) | (M) | (W) |
|---|---|---|---|
| Focal Length | 25.784 | 21.405 | 17.792 |
| Zoom Ratio | 1.449 | | |
| Half-Angle of View ω | 31.337 | 36.259 | 41.426 |
| F-Number | 2.660 | 2.517 | 2.400 |
| Group Distance | | | |
| T4 | 29.258 | 29.256 | 29.254 |
| T8 | 5.859 | 5.857 | 5.855 |
| T16 | 20.170 | 21.213 | 18.084 |
| T20 | 12.881 | 21.309 | 33.097 |
| T24 | 20.975 | 11.507 | 2.853 |
| T31 | 24.673 | 36.229 | 48.258 |
| T43 | 24.085 | 12.529 | 0.500 |

Miscellaneous Data 3

| | |
|---|---|
| BF | 78.773 |
| Lens Total Length | 450.000 |
| Maximum Image Height | 15.700 |

Miscellaneous Data 4
Focus Group Movement Amount

| | (T) | (M) | (W) |
|---|---|---|---|
| | Gr1b | | |
| 10988(E) | 0.000 | 0.000 | 0.000 |
| 1726(K) | −2.100 | −2.111 | −2.120 |
| | Gr1c | | |
| 10988(E) | 0.000 | 0.000 | 0.000 |
| 1726(K) | −3.938 | −3.959 | −3.976 |
| Movement Amount Ratio | 1.875 | | |

Miscellaneous Data 5
Focal Lengths of Lens Groups

| | |
|---|---|
| f1a | −117.952 |
| f1b | 154.762 |
| f1c | −110.103 |
| f2 | −117.608 |
| f3 | 65.119 |
| f4 | −86.001 |
| f5 | 185.492 |
| f6 | 120.623 |

| | (K) | (E) |
|---|---|---|
| f1 | −81.399 | −81.368 |
| φ1 | −0.012 | −0.012 |

EXAMPLE 3

Unit: mm

Surface Data

| i | CR | Ti | nd | νd |
|---|---|---|---|---|
| 1 | 103.916 | 6.465 | 1.65844 | 50.85 |
| 2 | 62.139 | 13.877 | | |
| 3 | 92.446 | 5.229 | 1.65844 | 50.85 |
| 4 | 52.678 | Variable (F) | | |
| 5 | 171.340 | 4.330 | 1.61800 | 63.39 |
| 6 | 60.549 | 14.197 | | |
| 7 | 220.092 | 11.772 | 1.91082 | 35.25 |
| 8 | −134.918 | Variable (F) | | |
| 9 | 143.299 | 3.777 | 1.80420 | 46.50 |
| 10 | 49.927 | 12.945 | | |
| 11 | 76.643 | 19.523 | 1.51680 | 64.20 |
| 12 | −60.449 | 0.200 | | |
| 13 | −106.614 | 2.890 | 1.49700 | 81.61 |
| 14 | 40.675 | Variable (F, Z) | | |
| 15 | −308.819 | 7.739 | 1.51742 | 52.15 |
| 16 | −39.530 | 0.200 | | |
| 17 | −51.843 | 2.262 | 1.80809 | 22.76 |
| 18 | 106.163 | Variable (Z) | | |
| 19 | 1326.720 | 4.967 | 1.80518 | 25.46 |
| 20 | −73.878 | 0.200 | | |
| 21 | 45.111 | 5.605 | 1.90366 | 31.31 |
| 22 | 191.877 | Variable (Z) | | |
| 23 | −121.743 | 1.688 | 1.49700 | 81.61 |
| 24 | 24.392 | 7.513 | | |
| 25 | −94.743 | 1.815 | 1.63854 | 55.45 |
| 26 | 66.854 | 0.534 | | |
| 27 | 42.218 | 5.050 | 1.68893 | 31.16 |
| 28 | −136.252 | Variable (Z) | | |
| 29 | ∞(ST) | 6.203 | | |
| 30 | 40.984 | 5.526 | 1.43700 | 95.10 |
| 31 | −52.172 | 0.200 | | |
| 32 | 37.179 | 4.583 | 1.60300 | 65.44 |
| 33 | −69.736 | 0.010 | 1.55000 | 47.00 |
| 34 | −69.736 | 1.177 | 1.72825 | 28.32 |
| 35 | 26.708 | 7.086 | | |
| 36 | −23.513 | 1.200 | 1.90366 | 31.31 |
| 37 | 62.268 | 0.010 | 1.55000 | 47.00 |
| 38 | 62.268 | 7.436 | 1.60300 | 65.44 |
| 39 | −28.063 | 0.200 | | |
| 40 | 111.435 | 5.826 | 1.49700 | 81.61 |
| 41 | −44.072 | Variable (Z) | | |
| 42 | 86.640 | 4.413 | 1.85896 | 22.73 |
| 43 | −137.880 | 12.000 | | |
| 44 | ∞ | 38.000 | 1.71300 | 53.94 |
| 45 | ∞ | 3.000 | | |
| 46 | ∞ | 1.050 | 1.48749 | 70.44 |
| 47 | ∞ | 0.200 | | |
| 48 (IM) | | | | |

| | (T) | (M) | (W) |
|---|---|---|---|
| Miscellaneous Data 1 Projection Distance 1751(K) | | | |
| Focal Length | 18.412 | 15.035 | 12.273 |
| Zoom Ratio | 1.500 | | |
| Half-Angle of View ω | 31.084 | 36.438 | 42.128 |
| F-Number | 2.399 | 2.337 | 2.276 |
| Group Distance | | | |
| T4 | 22.792 | 22.788 | 22.786 |
| T8 | 1.541 | 1.538 | 1.536 |
| T14 | 21.564 | 22.403 | 18.888 |
| T18 | 9.921 | 14.654 | 21.904 |
| T22 | 24.720 | 17.402 | 10.651 |
| T29 | 6.840 | 13.405 | 21.197 |
| T41 | 22.899 | 18.087 | 13.315 |

Unit: mm

| | (T) | (M) | (W) |
|---|---|---|---|
| Miscellaneous Data 2 Projection Distance 10914(E) | | | |
| Focal Length | 18.365 | 14.985 | 12.224 |
| Zoom Ratio | 1.502 | | |
| Half-Angle of View ω | 31.149 | 36.529 | 42.240 |
| F-Number | 2.399 | 2.337 | 2.276 |
| Group Distance | | | |
| T4 | 22.173 | 22.153 | 22.138 |
| T8 | 1.029 | 1.012 | 1.000 |
| T14 | 22.694 | 23.565 | 20.072 |
| T18 | 9.921 | 14.654 | 21.904 |
| T22 | 24.720 | 17.402 | 10.651 |
| T28 | 6.840 | 13.405 | 21.197 |
| T41 | 22.899 | 18.087 | 13.315 |

Miscellaneous Data 3

| | |
|---|---|
| BF | 38.090 |
| Lens Total Length | 280.000 |
| Maximum Image Height | 11.100 |

Miscellaneous Data 4
Focus Group Movement Amount

| | (T) | (M) | (W) |
|---|---|---|---|
| Gr1b | | | |
| 10914(E) | 0.000 | 0.000 | 0.000 |
| 1751(K) | −0.618 | −0.635 | −0.647 |
| Gr1c | | | |
| 10914(E) | 0.000 | 0.000 | 0.000 |
| 1751(K) | −1.130 | −1.161 | −1.184 |
| Movement Amount Ratio | 1.828 | | |

Miscellaneous Data 5
Focal Lengths of Lens Groups

| | |
|---|---|
| f1a | −105.790 |
| f1b | 184.139 |
| f1c | −80.886 |
| f2 | −83.006 |
| f3 | 36.481 |
| f4 | −58.270 |
| f5 | 105.273 |
| f6 | 61.874 |

| | (K) | (E) |
|---|---|---|
| fl | −49.039 | −48.927 |
| φl | −0.020 | −0.020 |

EXAMPLE 4

Unit: mm

Surface Data

| i | CR | Ti | nd | νd |
|---|---|---|---|---|
| 1 | 26.677 | 14.289 | 1.51680 | 64.20 |
| 2 | 886.738 | 0.300 | | |
| 3 | 129.208 | 6.212 | 1.65844 | 50.85 |
| 4 | 64.373 | Variable (F) | | |
| 5 | 557.492 | 4.746 | 1.49700 | 81.61 |
| 6 | 69.748 | 13.118 | | |
| 7 | 1464.263 | 4.027 | 1.63854 | 55.45 |
| 8 | 112.583 | Variable (F) | | |
| 9 | −80.111 | 4.842 | 1.69895 | 30.05 |
| 10 | 129.836 | 3.597 | | |

-continued

Unit: mm

| | | | | |
|---|---|---|---|---|
| 11 | 162.965 | 14.355 | 1.72342 | 37.99 |
| 12 | −81.466 | Variable (F, Z) | | |
| 13 | −230.447 | 5.009 | 1.56732 | 42.84 |
| 14 | 89.127 | 2.505 | | |
| 15 | 89.201 | 12.202 | 1.51680 | 64.20 |
| 16 | −117.615 | Variable (Z) | | |
| 17 | 119.308 | 5.180 | 1.72825 | 28.32 |
| 18 | 587.169 | Variable (Z) | | |
| 19 | 198.830 | 2.433 | 1.49700 | 81.61 |
| 20 | 52.676 | 13.459 | | |
| 21 | −232.275 | 2.150 | 1.63854 | 55.45 |
| 22 | 551.189 | 0.759 | | |
| 23 | 88.414 | 3.572 | 1.80610 | 40.73 |
| 24 | 561.553 | 7.767 | | |
| 25 | ∞(ST) | Variable (Z) | | |
| 26 | −1447.856 | 7.671 | 1.43700 | 95.10 |
| 27 | −54.735 | 3.469 | | |
| 28 | −49.941 | 2.903 | 1.80420 | 46.50 |
| 29 | −109.574 | 26.677 | | |
| 30 | −10035.603 | 9.023 | 1.43700 | 95.10 |
| 31 | −76.100 | 1.412 | | |
| 32 | 339.630 | 9.457 | 1.43700 | 95.10 |
| 33 | −87.694 | 1.990 | | |
| 34 | −97.643 | 3.773 | 1.80420 | 46.50 |
| 35 | 94.388 | 5.220 | | |
| 36 | 124.961 | 12.916 | 1.43700 | 95.10 |
| 37 | −99.348 | Variable (Z) | | |
| 38 | 102.894 | 8.901 | 1.49700 | 81.61 |
| 39 | −712.956 | 19.500 | | |
| 40 | ∞ | 116.500 | 1.51680 | 64.20 |
| 41 | ∞ | 4.000 | | |
| 42 | ∞ | 3.000 | 1.48749 | 70.44 |
| 43 | ∞ | 0.000 | | |
| 44 (IM) | | | | |

| | (T) | (M) | (W) |
|---|---|---|---|
| Miscellaneous Data 1 Projection Distance 1500(K) | | | |
| Focal Length | 49.329 | 43.174 | 37.015 |
| Zoom Ratio | 1.333 | | |
| Half-Angle of View ω | 24.519 | 27.526 | 31.294 |
| F-Number | 4.117 | 3.992 | 3.881 |
| Group Distance | | | |
| T4 | 19.500 | 19.500 | 19.500 |
| T8 | 32.512 | 32.512 | 32.512 |
| T12 | 42.029 | 62.332 | 92.009 |
| T16 | 34.237 | 29.919 | 17.457 |
| T18 | 33.707 | 18.641 | 3.000 |
| T25 | 28.568 | 43.624 | 58.163 |
| T37 | 33.089 | 17.113 | 1.000 |
| Miscellaneous Data 2 Projection Distance 5400(E) | | | |
| Focal Length | 49.654 | 43.468 | 37.270 |
| Zoom Ratio | 1.332 | | |
| Half-Angle of View ω | 24.377 | 27.367 | 31.119 |
| F-Number | 4.120 | 3.992 | 3.880 |
| Group Distance | | | |
| T4 | 23.374 | 23.374 | 23.374 |
| T8 | 43.162 | 43.162 | 43.162 |
| T12 | 27.505 | 47.809 | 77.486 |
| T16 | 34.237 | 29.919 | 17.457 |
| T18 | 33.707 | 18.641 | 3.000 |
| T25 | 28.568 | 43.624 | 58.163 |
| T37 | 33.089 | 17.113 | 1.000 |

Miscellaneous Data 3

| | |
|---|---|
| BF | 102.323 |
| Lens Total Length | 422.000 |
| Maximum Image Height | 22.500 |

-continued

Unit: mm

Miscellaneous Data 4
Focus Group Movement Amount

| | (T) | (M) | (W) |
|---|---|---|---|
| Gr1b | | | |
| 5400(E) | 0.000 | 0.000 | 0.000 |
| 1500(K) | 3.874 | 3.874 | 3.874 |
| Gr1c | | | |
| 5400(E) | 0.000 | 0.000 | 0.000 |
| 1500(K) | 14.524 | 14.524 | 14.524 |
| Movement Amount Ratio | 3.749 | | |

Miscellaneous Data 5
Focal Lengths of Lens Groups

| | |
|---|---|
| f1a | −522.488 |
| f1b | −83.432 |
| f1c | 1277.088 |
| f2 | 583.986 |
| f3 | 202.955 |
| f4 | −380.490 |
| f5 | 336.948 |
| f6 | 181.051 |

| | (K) | (E) |
|---|---|---|
| fl | −94.092 | −94.527 |
| φl | −0.011 | −0.011 |

TABLE 1

Example 1

| i | | | | fl | 1/(fn × vdn) | 1/(fn × ndn) |
|---|---|---|---|---|---|---|
| 1-2 | Gr1 | Gr1a | L1 | −310.730 | −7.82E−05 | −1.89E−03 |
| 3-4 | | | L2 | −204.622 | −1.29E−04 | −2.84E−03 |
| 5-6 | | Gr1b | L3 | −325.681 | −5.06E−05 | −1.92E−03 |
| 7-8 | | | L4 | 110.330 | 2.72E−04 | 5.02E−03 |
| 9-10 | | Gr1c | L5 | −126.484 | −2.12E−04 | −4.31E−03 |
| 11-12 | | | L6 | −204.578 | −7.71E−05 | −3.02E−03 |
| 13-14 | | | L7 | 87.898 | 1.62E−04 | 7.65E−03 |
| 15-16 | | | L8 | −123.252 | −1.50E−04 | −4.74E−03 |
| 17-18 | Gr2 | | L9 | 187.600 | 8.30E−05 | 3.51E−03 |
| 19-20 | | | L10 | −72.772 | −6.04E−04 | −7.60E−03 |
| 21-22 | Gr3 | | L11 | 152.998 | 1.96E−04 | 3.62E−03 |
| 23-24 | | | L12 | 87.049 | 3.67E−04 | 6.03E−03 |
| 25-26 | Gr4 | | L13 | −76.177 | −1.38E−04 | −9.14E−03 |
| 27-28 | | | L14 | −66.119 | −1.59E−04 | −1.05E−02 |
| 29-30 | | | L15 | 66.298 | 2.69E−04 | 9.61E−03 |
| 31 | | | ST | | | |
| 32-33 | Gr5 | | L16 | 332.067 | 3.17E−05 | 2.10E−03 |
| 34-35 | | | L17 | −142.541 | −1.72E−04 | −3.73E−03 |
| 36-37 | | | L18 | 104.547 | 1.01E−04 | 6.66E−03 |
| 38-39 | | | L19 | 168.649 | 6.24E−05 | 4.13E−03 |
| 40-41 | | | L20 | −53.940 | −4.55E−04 | −1.03E−02 |
| 42-43 | | | L21 | 91.021 | 1.16E−04 | 7.65E−03 |
| 44-45 | Gr6 | | L22 | 118.822 | 1.13E−04 | 5.47E−03 |
| 46-47 | | | PR | | | |
| 48-49 | | | CG | | | |

TABLE 2

Example 2

| i | | | | fl | 1/(fn × vdn) | 1/(fn × ndn) |
|---|---|---|---|---|---|---|
| 1-2 | Gr1 | Gr1a | L1 | −307.829 | −7.89E−05 | −1.91E−03 |
| 3-4 | | | L2 | −206.778 | −1.27E−04 | −2.81E−03 |
| 5-6 | | Gr1b | L3 | −314.412 | −5.24E−05 | −1.98E−03 |

TABLE 2-continued

Example 2

| i | | | fl | 1/(fn × vdn) | 1/(fn × ndn) |
|---|---|---|---|---|---|
| 7-8 | | L4 | 108.940 | 2.76E−04 | 5.08E−03 |
| 9-10 | Gr1c | L5 | −126.267 | −2.12E−04 | −4.32E−03 |
| 11-12 | | L6 | −197.991 | −7.97E−05 | −3.12E−03 |
| 13-14 | | L7 | 86.266 | 1.65E−04 | 7.79E−03 |
| 15-16 | | L8 | −124.118 | −1.49E−04 | −4.70E−03 |
| 17-18 | Gr2 | L9 | 182.425 | 8.54E−05 | 3.61E−03 |
| 19-20 | | L10 | −71.919 | −6.11E−04 | −7.69E−03 |
| 21-22 | Gr3 | L11 | 158.576 | 1.90E−04 | 3.49E−03 |
| 23-24 | | L12 | 87.223 | 3.66E−04 | 6.02E−03 |
| 25-26 | Gr4 | L13 | −77.757 | −1.35E−04 | −8.95E−03 |
| 27-28 | | L14 | −64.745 | −1.62E−04 | −1.07E−02 |
| 29-30 | | L15 | 66.101 | 2.70E−04 | 9.64E−03 |
| 31 | | ST | | | |
| 32-33 | Gr5 | L16 | 373.716 | 2.81E−05 | 1.86E−03 |
| 34-35 | | L17 | −154.088 | −1.59E−04 | −3.45E−03 |
| 36-37 | | L18 | 103.515 | 1.02E−04 | 6.72E−03 |
| 38-39 | | L19 | 160.341 | 6.56E−05 | 4.34E−03 |
| 40-41 | | L20 | −53.147 | −4.62E−04 | −1.04E−02 |
| 42-43 | | L21 | 92.195 | 1.14E−04 | 7.55E−03 |
| 44-45 | Gr6 | L22 | 120.623 | 1.11E−04 | 5.39E−03 |
| 46-47 | | PR | | | |
| 48-49 | | CG | | | |

TABLE 3

Example 3

| i | | | | fl | 1/(fn × vdn) | 1/(fn × ndn) |
|---|---|---|---|---|---|---|
| 1-2 | Gr1 | Gr1a | L1 | −248.991 | −7.90E−05 | −2.42E−03 |
| 3-4 | | | L2 | −195.340 | −1.01E−04 | −3.09E−03 |
| 5-6 | | Gr1b | L3 | −153.247 | −1.03E−04 | −4.03E−03 |
| 7-8 | | | L4 | 92.690 | 3.06E−04 | 5.65E−03 |
| 9-10 | | Gr1c | L5 | −96.539 | −2.23E−04 | −5.74E−03 |
| 11-12 | | | L6 | 68.482 | 2.27E−04 | 9.63E−03 |
| 13-14 | | | L7 | −58.685 | −2.09E−04 | −1.14E−02 |
| 15-16 | Gr2 | | L8 | 86.367 | 2.22E−04 | 7.63E−03 |
| 17-18 | | | L9 | −42.392 | −1.04E−03 | −1.30E−02 |
| 19-20 | Gr3 | | L10 | 86.254 | 4.55E−04 | 6.42E−03 |
| 21-22 | | | L11 | 63.617 | 5.02E−04 | 8.26E−03 |
| 23-24 | Gr4 | | L12 | −40.611 | −3.02E−04 | −1.64E−02 |
| 25-26 | | | L13 | −60.853 | −2.96E−04 | −1.00E−02 |
| 27-28 | | | L14 | 46.977 | 6.83E−04 | 1.26E−02 |
| 29 | Gr5 | | ST | | | |
| 30-31 | | | L15 | 53.357 | 1.97E−04 | 1.30E−02 |
| 32-33 | | | L16 | 58.842 | 2.60E−04 | 1.06E−02 |
| 34-35 | | | L17 | −26.164 | −1.35E−03 | −2.21E−02 |
| 36-37 | | | L18 | −22.418 | −1.42E−03 | −2.34E−02 |
| 38-39 | | | L19 | 32.988 | 4.63E−04 | 1.89E−02 |
| 40-41 | | | L20 | 64.159 | 1.91E−04 | 1.04E−02 |
| 42-43 | Gr6 | | L21 | 61.874 | 7.11E−04 | 8.69E−03 |
| 44-45 | | | PR | | | |
| 46-47 | | | CG | | | |

TABLE 4

Example 4

| i | | | | fl | 1/(fn × vdn) | 1/(fn × ndn) |
|---|---|---|---|---|---|---|
| 1-2 | Gr1 | Gr1a | L1 | 359.864 | 4.33E−05 | 1.83E−03 |
| 3-4 | | | L2 | −201.623 | −9.75E−05 | −2.99E−03 |
| 5-6 | | Gr1b | L3 | −160.459 | −7.64E−05 | −4.16E−03 |
| 7-8 | | | L4 | −190.401 | −9.47E−05 | −3.21E−03 |
| 9-10 | | Gr1c | L5 | −69.664 | −4.78E−04 | −8.45E−03 |
| 11-12 | | | L6 | 76.508 | 3.44E−04 | 7.58E−03 |
| 13-14 | Gr2 | | L7 | −112.025 | −2.08E−04 | −5.70E−03 |
| 15-16 | | | L8 | 99.806 | 1.56E−04 | 6.61E−03 |
| 17-18 | Gr3 | | L9 | 202.955 | 1.74E−04 | 2.85E−03 |
| 19-20 | Gr4 | | L10 | −144.568 | −8.48E−05 | −4.62E−03 |
| 21-22 | | | L11 | −254.545 | −7.08E−05 | −2.40E−03 |

TABLE 4-continued

Example 4

| i | | | fl | 1/(fn × vdn) | 1/(fn × ndn) |
|---|---|---|---|---|---|
| 23-24 | | L12 | 128.985 | 1.90E−04 | 4.29E−03 |
| 25 | | ST | | | |
| 26-27 | Gr5 | L13 | 129.628 | 8.11E−05 | 5.37E−03 |
| 28-29 | | L14 | −116.052 | −1.85E−04 | −4.78E−03 |
| 30-31 | | L15 | 174.984 | 6.01E−05 | 3.98E−03 |
| 32-33 | | L16 | 160.171 | 6.57E−05 | 4.34E−03 |
| 34-35 | | L17 | −58.858 | −3.65E−04 | −9.42E−03 |
| 36-37 | | L18 | 128.589 | 8.18E−05 | 5.41E−03 |
| 38-39 | Gr6 | L19 | 181.051 | 6.77E−05 | 3.69E−03 |
| 40-41 | | PR | | | |
| 42-43 | | CG | | | |

TABLE 5

| Conditional Formula | | | Example 1 | Example 2 | Example 3 | Example 4 |
|---|---|---|---|---|---|---|
| (1) | fl/fw | (K) | −4.544 | −4.624 | −3.996 | −2.542 |
| | | (E) | −4.496 | −4.573 | −4.002 | −2.536 |
| (2) | \|Σ(1/(fn × vdn)) × 1000\| | | 0.263 | 0.259 | 0.181 | 0.359 |
| (3) | \|Σ(1/(fn × ndn)) × 1000\| | | 6.044 | 5.967 | 11.393 | 9.392 |
| (4) | \|(f1b/f1c) × dx\| | | 2.665 | 2.636 | 4.161 | 0.245 |

Although the disclosure has been described with respect to only a limited number of embodiments, those skilled in the art, having benefit of this disclosure, will appreciate that various other embodiments may be derived without departing from the scope of the present invention. Accordingly, the scope of the invention should be limited only by the attached claims.

What is claimed is:

1. A projection lens system that performs a zoom by varying distances between a plurality of lens groups, the projection lens system comprising:
a first lens group comprising:
a 1a-th lens group having a negative refractive power,
a 1b-th lens group having a positive or negative refractive power, and
a 1c-th lens group having a positive or negative refractive power,
wherein, during a zoom, the first lens group remains stationary on an optical axis,
wherein, during a focus from a remote distance side to a close distance side, the 1a-th lens group remains stationary on the optical axis while the 1b-th and 1c-th lens groups move toward the enlargement conjugate side along different loci respectively, and
wherein conditional formula (1) below is fulfilled at both the remote and close distance sides:

$$-4.7 < fl/fw < -2.5 \qquad (1)$$

where
fl represents a focal length of the first lens group; and
fw represents a focal length of the entire system at a wide-angle end.

2. The projection lens system of claim 1, wherein only the 1b-th or 1c-th lens group has a positive refractive power and comprises one positive lens element and one negative lens element.

3. The projection lens system of claim 2, wherein the 1b-th and 1c-th lens groups fulfill conditional formula (2) below:

$$0 < |\Sigma(1/(fn \times vdn)) \times 1000| < 2.7 \qquad (2)$$

where
fn represents a focal length of a single lens element included in the 1b-th and 1c-th lens groups; and
vdn represents an Abbe number of the single lens element included in the 1b-th and 1c-th lens groups.

4. The projection lens system of claim 3, wherein the 1b-th and 1c-th lens groups fulfill conditional formula (3) below:

$$0<|\Sigma(1/(fn \times ndn)) \times 1000|<6.1 \tag{3}$$

where
fn represents the focal length of the single lens element included in the 1b-th and 1c-th lens groups; and
ndn represents a refractive index of the single lens element included in the 1b-th and 1c-th lens groups.

5. The projection lens system of claim 4, wherein conditional formula (4) below is fulfilled:

$$2.5<|(f1b/f1c) \times dx|<4.2 \tag{4}$$

where
f1b represents a focal length of the 1b-th lens group;
f1c represents a focal length of the 1c-th lens group; and
dx represents a ratio of an amount of movement of the 1c-th lens group to an amount of movement of the 1b-th lens group for focusing.

6. The projection lens system of claim 3, wherein conditional formula (4) below is fulfilled:

$$2.5<|(f1b/f1c) \times dx|<4.2 \tag{4}$$

where
f1b represents a focal length of the 1b-th lens group;
f1c represents a focal length of the 1c-th lens group; and
dx represents a ratio of an amount of movement of the 1c-th lens group to an amount of movement of the 1b-th lens group for focusing.

7. The projection lens system of claim 2, wherein the 1b-th and 1c-th lens groups fulfill conditional formula (3) below:

$$0<|\Sigma(1/(fn \times ndn)) \times 1000|<6.1 \tag{3}$$

where
fn represents a focal length of a single lens element included in the 1b-th and 1c-th lens groups; and
ndn represents a refractive index of the single lens element included in the 1b-th and 1c-th lens groups.

8. The projection lens system of claim 7, wherein conditional formula (4) below is fulfilled:

$$2.5<|(f1b/f1c) \times dx|<4.2 \tag{4}$$

where
f1b represents a focal length of the 1b-th lens group;
f1c represents a focal length of the 1c-th lens group; and
dx represents a ratio of an amount of movement of the 1c-th lens group to an amount of movement of the 1b-th lens group for focusing.

9. The projection lens system of claim 2, wherein conditional formula (4) below is fulfilled:

$$2.5<|(f1b/f1c) \times dx|<4.2 \tag{4}$$

where
f1b represents a focal length of the 1b-th lens group;
f1c represents a focal length of the 1c-th lens group; and
dx represents a ratio of an amount of movement of the 1c-th lens group to an amount of movement of the 1b-th lens group for focusing.

10. A projector comprising an image forming device that forms image light and the projection lens system of claim 2 that projects the image light on a magnified scale.

11. The projection lens system of claim 1, wherein the 1b-th and 1c-th lens groups fulfill conditional formula (2) below:

$$0<|\Sigma(1/(fn \times vdn)) \times 1000|<2.7 \tag{2}$$

where
fn represents a focal length of a single lens element included in the 1b-th and 1c-th lens groups; and
vdn represents an Abbe number of the single lens element included in the 1b-th and 1c-th lens groups.

12. The projection lens system of claim 11, wherein the 1b-th and 1c-th lens groups fulfill conditional formula (3) below:

$$0<|\Sigma(1/(fn \times ndn)) \times 1000|<6.1 \tag{3}$$

where
fn represents the focal length of the single lens element included in the 1b-th and 1c-th lens groups; and
ndn represents a refractive index of the single lens element included in the 1b-th and 1c-th lens groups.

13. The projection lens system of claim 12, wherein conditional formula (4) below is fulfilled:

$$2.5<|(f1b/f1c) \times dx|<4.2 \tag{4}$$

where
f1b represents a focal length of the 1b-th lens group;
f1c represents a focal length of the 1c-th lens group; and
dx represents a ratio of an amount of movement of the 1c-th lens group to an amount of movement of the 1b-th lens group for focusing.

14. The projection lens system of claim 11, wherein conditional formula (4) below is fulfilled:

$$2.5<|(f1b/f1c) \times dx|<4.2 \tag{4}$$

where
f1b represents a focal length of the 1b-th lens group;
f1c represents a focal length of the 1c-th lens group; and
dx represents a ratio of an amount of movement of the 1c-th lens group to an amount of movement of the 1b-th lens group for focusing.

15. A projector comprising an image forming device that forms image light and the projection lens system of claim 11 that projects the image light on a magnified scale.

16. The projection lens system of claim 1, wherein the 1b-th and 1c-th lens groups fulfill conditional formula (3) below:

$$0<|\Sigma(1/(fn \times ndn)) \times 1000|<6.1 \tag{3}$$

where
fn represents a focal length of a single lens element included in the 1b-th and 1c-th lens groups; and
ndn represents a refractive index of the single lens element included in the 1b-th and 1c-th lens groups.

17. The projection lens system of claim 16, wherein conditional formula (4) below is fulfilled:

$$2.5<|(f1b/f1c) \times dx|<4.2 \tag{4}$$

where
f1b represents a focal length of the 1b-th lens group;
f1c represents a focal length of the 1c-th lens group; and
dx represents a ratio of an amount of movement of the 1c-th lens group to an amount of movement of the 1b-th lens group for focusing.

18. A projector comprising an image forming device that forms image light and the projection lens system of claim 16 that projects the image light on a magnified scale.

19. The projection lens system of claim 1, wherein conditional formula (4) below is fulfilled:

$$2.5 < |(f1b/f1c) \times dx| < 4.2 \qquad (4)$$

where f1b represents a focal length of the 1b-th lens group;

f1c represents a focal length of the 1c-th lens group; and dx represents a ratio of an amount of movement of the 1c-th lens group to an amount of movement of the 1b-th lens group for focusing.

20. A projector comprising an image forming device that forms image light and the projection lens system of claim 1 that projects the image light on a magnified scale.

\* \* \* \* \*